US012703816B2

(12) United States Patent
Bauer et al.

(10) Patent No.: US 12,703,816 B2
(45) **Date of Patent: *Aug. 11, 2026**

(54) SHAPED ABRASIVE PARTICLES AND METHODS OF FORMING SAME

(71) Applicant: SAINT-GOBAIN CERAMICS & PLASTICS, INC., Worcester, MA (US)

(72) Inventors: Ralph Bauer, Niagara Falls (CA); Martin Barnes, Youngstown, NY (US); Margaret L. Skowron, Niagara Falls, NY (US); Rene G. Demers, Niagara Falls (CA)

(73) Assignee: SAINT-GOBAIN CERAMICS & PLASTICS, INC., Worcester, MA (US)

( * ) Notice: Subject to any disclaimer, the term of this patent is extended or adjusted under 35 U.S.C. 154(b) by 84 days.

This patent is subject to a terminal disclaimer.

(21) Appl. No.: 18/775,740

(22) Filed: Jul. 17, 2024

(65) Prior Publication Data

US 2024/0392176 A1 Nov. 28, 2024

Related U.S. Application Data

(63) Continuation of application No. 15/975,549, filed on May 9, 2018, now Pat. No. 12,043,784, which is a (Continued)

(51) Int. Cl.

*B01J 2/22* (2006.01)
*B01J 2/20* (2006.01)

(Continued)

(52) U.S. Cl.

CPC ............... *C09K 3/1409* (2013.01); *B01J 2/20* (2013.01); *B01J 2/22* (2013.01); *C04B 35/10* (2013.01);

(Continued)

(58) Field of Classification Search

CPC ....... B01J 2/20; B01J 2/22; C04B 2235/6021; C04B 2235/3217; C04B 35/624;

(Continued)

(56) References Cited

U.S. PATENT DOCUMENTS

| | | | |
|---|---|---|---|
| 345,604 | A | 7/1886 | Semper |
| 1,910,444 | A | 5/1933 | Nicholson |

(Continued)

FOREIGN PATENT DOCUMENTS

| | | | |
|---|---|---|---|
| CA | 743715 | A | 10/1966 |
| CA | 2423788 | A1 | 7/2002 |

(Continued)

OTHER PUBLICATIONS

Torre, "Investigation of Shaped Abrasive Particles vol. 1: Review of U.S. Pat. No. 6,054,093 Apr. 25, 2000" © Apr. 2011.

(Continued)

*Primary Examiner* — Alison L Hindenlang
*Assistant Examiner* — Debjani Roy
(74) *Attorney, Agent, or Firm* — Abel Schillinger, LLP; Jermaine Lawrence

(57) ABSTRACT

A method of forming a shaped abrasive particle includes applying a mixture into a shaping assembly within an application zone and directing an ejection material at the mixture in the shaping assembly under a predetermined force, removing the mixture from the shaping assembly and forming a precursor shaped abrasive particle.

15 Claims, 9 Drawing Sheets

Related U.S. Application Data continuation of application No. 15/592,430, filed on May 11, 2017, now Pat. No. 10,000,676, which is a continuation of application No. 15/213,758, filed on Jul. 19, 2016, now Pat. No. 9,688,893, which is a continuation of application No. 14/925,191, filed on Oct. 28, 2015, now Pat. No. 9,428,681, which is a continuation of application No. 13/901,362, filed on May 23, 2013, now Pat. No. 9,200,187.

(60) Provisional application No. 61/650,673, filed on May 23, 2012.

(51) Int. Cl.
*C04B 35/10* (2006.01)
*C04B 35/624* (2006.01)
*C09K 3/14* (2006.01)

(52) U.S. Cl.
CPC .......... *C04B 35/624* (2013.01); *C09K 3/1427* (2013.01); *C04B 2235/3217* (2013.01); *C04B 2235/6021* (2013.01); *Y10T 428/2982* (2015.01)

(58) Field of Classification Search
CPC ........ C04B 35/10; C09K 3/14; C09K 3/1409; C09K 3/1427; B24D 3/14
See application file for complete search history.

(56) References Cited

U.S. PATENT DOCUMENTS 2,033,991 A 3/1936 Melton et al.
2,036,903 A 4/1936 Webster
2,049,874 A 8/1936 Sherk
2,148,400 A 2/1939 Crompton, Jr.
2,248,064 A 7/1941 Carlton et al.
2,248,990 A 7/1941 Heany
2,290,877 A 7/1942 Heany
2,318,360 A 5/1943 Benner et al.
2,376,343 A 5/1945 Carlton
2,563,650 A 8/1951 Heinemann
2,880,080 A 3/1959 Rankin et al.
3,041,156 A 6/1962 Rowse et al.
3,067,551 A 12/1962 Maginnis
3,079,242 A 2/1963 Glasgow
3,079,243 A 2/1963 Ueltz
3,123,948 A 3/1964 Kistler et al.
3,141,271 A 7/1964 Fischer et al.
3,276,852 A 10/1966 Lemelson
3,377,660 A 4/1968 Marshall et al.
3,379,543 A 4/1968 Norwalk
3,387,957 A 6/1968 Howard
3,454,385 A 7/1969 Amero
3,477,180 A 11/1969 Robertson, Jr. et al.
3,480,395 A 11/1969 McMullen et al.
3,481,723 A 12/1969 Kistler et al.
3,491,492 A 1/1970 Ueltz
3,495,359 A 2/1970 Smith et al.
3,536,005 A 10/1970 Derrickson
3,590,799 A 7/1971 Guuchowicz
3,608,050 A 9/1971 Carman et al.
3,608,134 A 9/1971 Cook
3,615,308 A 10/1971 Amero
3,619,151 A 11/1971 Sheets, Jr. et al.
3,637,360 A 1/1972 Ueltz
3,670,467 A 6/1972 Walker
3,672,934 A 6/1972 Larry
3,808,747 A 5/1974 Kenagy
3,819,785 A 6/1974 Argyle et al.
3,859,407 A 1/1975 Blanding et al.
3,874,856 A 4/1975 Leeds
3,909,991 A 10/1975 Coes, Jr.
3,940,276 A 2/1976 Wilson
3,950,148 A 4/1976 Fukuda et al.
3,960,577 A 6/1976 Prochazka
3,977,132 A 8/1976 Sekigawa
3,986,885 A 10/1976 Lankard
3,991,527 A 11/1976 Maran
4,004,934 A 1/1977 Prochazka
4,037,367 A 7/1977 Kruse
4,045,919 A 9/1977 Moritomo
4,055,451 A 10/1977 Cockbain et al.
4,073,096 A 2/1978 Ueltz et al.
4,114,322 A 9/1978 Greenspan
4,150,078 A 4/1979 Miller et al.
4,194,887 A 3/1980 Ueltz et al.
4,252,544 A 2/1981 Takahashi
4,261,706 A 4/1981 Blanding et al.
4,286,905 A 9/1981 Samanta
4,304,576 A 12/1981 Hattori et al.
4,314,827 A 2/1982 Leitheiser et al.
4,341,663 A 7/1982 Derleth et al.
4,393,021 A 7/1983 Eisenberg et al.
4,452,911 A 6/1984 Eccles et al.
4,457,767 A 7/1984 Poon et al.
4,469,758 A 9/1984 Scott
4,505,720 A 3/1985 Gabor et al.
4,541,842 A 9/1985 Rostoker
4,548,617 A 10/1985 Miyatani et al.
4,570,048 A 2/1986 Poole
4,618,349 A 10/1986 Hashimoto et al.
4,623,364 A 11/1986 Cottringer et al.
4,656,330 A 4/1987 Poole
4,657,754 A 4/1987 Bauer et al.
4,659,341 A 4/1987 Ludwig et al.
4,678,560 A 7/1987 Stole et al.
4,711,750 A 12/1987 Scott
4,728,043 A 3/1988 Ersdal et al.
4,744,802 A 5/1988 Schwabel
4,770,671 A 9/1988 Monroe
4,786,292 A 11/1988 Janz et al.
4,797,139 A 1/1989 Bauer
4,797,269 A 1/1989 Bauer et al.
4,799,939 A 1/1989 Bloecher et al.
4,829,027 A 5/1989 Cutler et al.
4,832,706 A 5/1989 Yates
4,848,041 A 7/1989 Kruschke
4,858,527 A 8/1989 Masanao
4,863,573 A 9/1989 Moore et al.
4,876,226 A 10/1989 Fuentes
4,881,951 A 11/1989 Monroe et al.
4,917,852 A 4/1990 Poole et al.
4,918,116 A 4/1990 Gardziella et al.
4,925,457 A 5/1990 deKok et al.
4,925,815 A 5/1990 Tani et al.
4,930,266 A 6/1990 Calhoun et al.
4,942,011 A 7/1990 Bolt et al.
4,954,462 A 9/1990 Wood
4,960,441 A 10/1990 Pellow et al.
4,961,757 A 10/1990 Rhodes et al.
4,963,012 A 10/1990 Tracy
4,964,883 A 10/1990 Morris et al.
4,970,057 A 11/1990 Willkens et al.
4,997,461 A 3/1991 Markhoff-Matheny et al.
5,000,760 A 3/1991 Ohtsubo et al.
5,008,222 A 4/1991 Kameda
5,009,675 A 4/1991 Kunz et al.
5,009,676 A 4/1991 Rue et al.
5,011,508 A 4/1991 Wald et al.
5,011,510 A 4/1991 Hayakawa et al.
5,014,468 A 5/1991 Ravipati et al.
5,024,795 A 6/1991 Kennedy et al.
5,032,304 A 7/1991 Toyota
5,035,723 A 7/1991 Kalinowski et al.
5,035,724 A 7/1991 Pukari et al.
5,042,991 A 8/1991 Kunz et al.
5,049,165 A 9/1991 Tselesin
5,049,166 A 9/1991 Kirkendall
5,049,645 A 9/1991 Nagaoka et al.
5,053,367 A 10/1991 Newkirk et al.
5,053,369 A 10/1991 Winkler et al.
5,076,991 A 12/1991 Poole et al.

(56) References Cited

U.S. PATENT DOCUMENTS 5,078,753 A 1/1992 Broberg et al.
5,081,082 A 1/1992 Hai-Doo et al.
5,085,671 A 2/1992 Martin et al.
5,090,968 A 2/1992 Pellow
5,094,986 A 3/1992 Matsumoto et al.
5,098,740 A 3/1992 Tewari
5,103,598 A 4/1992 Kelly
5,108,963 A 4/1992 Fu et al.
5,114,438 A 5/1992 Leatherman et al.
5,120,327 A 6/1992 Dennis
5,123,935 A 6/1992 Kanamaru et al.
5,129,919 A 7/1992 Kalinowski et al.
5,131,926 A 7/1992 Rostoker et al.
5,132,984 A 7/1992 Simpson
5,139,978 A 8/1992 Wood
5,152,917 A 10/1992 Pieper et al.
5,160,509 A 11/1992 Carman et al.
5,164,744 A 11/1992 Yoshida et al.
5,173,457 A 12/1992 Shorthouse
5,178,849 A 1/1993 Bauer
5,180,630 A 1/1993 Giglia
5,185,012 A 2/1993 Kelly
5,185,299 A 2/1993 Wood et al.
5,190,568 A 3/1993 Tselesin
5,194,072 A 3/1993 Rue et al.
5,201,916 A 4/1993 Berg et al.
5,203,886 A 4/1993 Sheldon et al.
5,213,591 A 5/1993 Celikkaya et al.
5,215,552 A 6/1993 Sung
5,219,462 A 6/1993 Bruxvoort et al.
5,219,806 A 6/1993 Wood
5,221,294 A 6/1993 Carman et al.
5,224,970 A 7/1993 Harakawa et al.
5,227,104 A 7/1993 Bauer
5,244,477 A 9/1993 Rue et al.
5,244,849 A 9/1993 Roy et al.
5,273,558 A 12/1993 Nelson et al.
5,277,702 A 1/1994 Thibault et al.
5,282,875 A 2/1994 Wood
5,288,297 A 2/1994 Ringwood
5,300,130 A 4/1994 Rostoker
5,304,331 A 4/1994 Leonard et al.
5,312,789 A 5/1994 Wood
5,312,791 A 5/1994 Coblenz et al.
5,314,513 A 5/1994 Miller et al.
5,366,523 A 11/1994 Rowenhorst et al.
5,366,525 A 11/1994 Fujiyama
5,372,620 A 12/1994 Rowse et al.
5,373,786 A 12/1994 Umaba
5,376,598 A 12/1994 Preedy et al.
5,376,602 A 12/1994 Nilsen
5,383,945 A 1/1995 Cottringer et al.
5,395,407 A 3/1995 Cottringer et al.
5,409,645 A 4/1995 Torre, Jr. et al.
5,429,648 A 7/1995 Wu
5,431,967 A 7/1995 Manthiram
5,435,816 A 7/1995 Spurgeon et al.
5,437,754 A 8/1995 Calhoun
5,441,549 A 8/1995 Helmin
5,443,603 A 8/1995 Kirkendall
5,447,894 A 9/1995 Yasuoka et al.
5,453,106 A 9/1995 Roberts
5,454,844 A 10/1995 Hibbard et al.
5,470,806 A 11/1995 Krstic et al.
5,479,873 A 1/1996 Shintani et al.
5,482,756 A 1/1996 Berger et al.
5,486,496 A 1/1996 Talbert et al.
5,489,318 A 2/1996 Erickson et al.
5,496,386 A 3/1996 Broberg et al.
5,498,268 A 3/1996 Gagliardi et al.
5,500,273 A 3/1996 Holmes et al.
5,514,631 A 5/1996 Cottringer et al.
5,516,347 A 5/1996 Garg
5,516,348 A 5/1996 Conwell et al.
5,523,074 A 6/1996 Takahashi et al.
5,525,100 A 6/1996 Kelly et al.
5,527,369 A 6/1996 Garg
5,543,368 A 8/1996 Talbert et al.
5,549,962 A 8/1996 Holmes et al.
5,551,963 A 9/1996 Larmie
5,560,745 A 10/1996 Roberts
5,567,150 A 10/1996 Conwell et al.
5,567,214 A 10/1996 Ashley
5,567,251 A 10/1996 Peker et al.
5,571,297 A 11/1996 Swei et al.
5,576,409 A 11/1996 Mackey
5,578,095 A 11/1996 Bland et al.
5,578,222 A 11/1996 Trischuk et al.
5,582,625 A 12/1996 Wright et al.
5,584,896 A 12/1996 Broberg et al.
5,584,897 A 12/1996 Christianson et al.
5,591,685 A 1/1997 Mitomo et al.
5,593,468 A 1/1997 Khaund et al.
5,599,493 A 2/1997 Ito et al.
5,603,738 A 2/1997 Zeiringer et al.
5,609,706 A 3/1997 Benedict et al.
5,611,829 A 3/1997 Monroe et al.
5,618,221 A 4/1997 Furukawa et al.
5,628,952 A 5/1997 Holmes et al.
5,641,469 A 6/1997 Garg et al.
RE35,570 E 7/1997 Rowenhorst et al.
5,645,619 A 7/1997 Erickson et al.
5,651,925 A 7/1997 Ashley et al.
5,656,217 A 8/1997 Rogers et al.
5,667,542 A 9/1997 Law et al.
5,669,941 A 9/1997 Peterson
5,669,943 A 9/1997 Horton et al.
5,672,097 A 9/1997 Hoopman
5,672,554 A 9/1997 Mohri et al.
5,683,844 A 11/1997 Mammino
5,702,811 A 12/1997 Ho et al.
5,725,162 A 3/1998 Garg et al.
5,736,619 A 4/1998 Kane et al.
5,738,696 A 4/1998 Wu
5,738,697 A 4/1998 Wu et al.
5,751,313 A 5/1998 Miyashita et al.
5,759,481 A 6/1998 Pujari et al.
5,776,214 A 7/1998 Wood
5,779,743 A 7/1998 Wood
5,785,722 A 7/1998 Garg et al.
5,810,587 A 9/1998 Bruns et al.
5,820,450 A 10/1998 Calhoun
5,830,248 A 11/1998 Christianson et al.
5,840,089 A 11/1998 Chesley et al.
5,849,646 A 12/1998 Stout et al.
5,855,997 A 1/1999 Amateau
5,863,306 A 1/1999 Wei et al.
5,866,254 A 2/1999 Peker et al.
5,876,793 A 3/1999 Sherman et al.
5,885,311 A 3/1999 McCutcheon et al.
5,893,935 A 4/1999 Wood
5,902,647 A 5/1999 Venkataramani
5,908,477 A 6/1999 Harmer et al.
5,908,478 A 6/1999 Wood
5,919,549 A 7/1999 Van et al.
5,924,917 A 7/1999 Benedict et al.
5,946,991 A 9/1999 Hoopman
5,975,987 A 11/1999 Hoopman et al.
5,980,678 A 11/1999 Tselesin
5,984,988 A 11/1999 Berg et al.
5,989,301 A 11/1999 Laconto, Sr. et al.
5,997,597 A 12/1999 Hagan
6,016,660 A 1/2000 Abramshe
6,019,805 A 2/2000 Herron
6,024,824 A 2/2000 Krech
6,027,326 A 2/2000 Cesarano, III et al.
6,039,775 A 3/2000 Ho et al.
6,048,577 A 4/2000 Garg
6,053,956 A 4/2000 Wood
6,054,093 A 4/2000 Torre, Jr. et al.
6,080,215 A 6/2000 Stubbs et al.
6,080,216 A 6/2000 Erickson
6,083,622 A 7/2000 Garg et al.
6,096,107 A 8/2000 Caracostas et al.

(56) References Cited

U.S. PATENT DOCUMENTS 6,110,241 A 8/2000 Sung
6,129,540 A 10/2000 Hoopman et al.
6,136,288 A 10/2000 Bauer et al.
6,146,247 A 11/2000 Nokubi et al.
6,179,887 B1 1/2001 Barber, Jr. et al.
6,206,942 B1 3/2001 Wood
6,228,134 B1 5/2001 Erickson
6,238,450 B1 5/2001 Garg et al.
6,258,137 B1 7/2001 Garg et al.
6,258,141 B1 7/2001 Sung et al.
6,261,682 B1 7/2001 Law
6,264,710 B1 7/2001 Erickson
6,277,160 B1 8/2001 Stubbs et al.
6,277,161 B1 8/2001 Castro et al.
6,283,997 B1 9/2001 Garg et al.
6,284,690 B1 9/2001 Nakahata et al.
6,287,353 B1 9/2001 Celikkaya
6,306,007 B1 10/2001 Mori et al.
6,312,324 B1 11/2001 Mitsui et al.
6,319,108 B1 11/2001 Adefris et al.
6,331,343 B1 12/2001 Perez et al.
6,371,842 B1 4/2002 Romero
6,391,812 B1 5/2002 Araki et al.
6,398,989 B1 6/2002 Bergstrom
6,401,795 B1 6/2002 Cesarano, III et al.
6,403,001 B1 6/2002 Hayashi
6,406,200 B2 6/2002 Mahoney
6,413,286 B1 7/2002 Swei et al.
6,428,392 B1 8/2002 Sunahara et al.
6,451,076 B1 9/2002 Nevoret et al.
6,475,253 B2 11/2002 Culler et al.
6,500,493 B2 12/2002 Swei et al.
6,511,938 B1 1/2003 Liu et al.
6,524,681 B1 2/2003 Seitz et al.
6,531,423 B1 3/2003 Schwetz et al.
6,537,140 B1 3/2003 Miller et al.
6,579,819 B2 6/2003 Hirosaki et al.
6,582,623 B1 6/2003 Grumbine et al.
6,583,080 B1 6/2003 Rosenflanz
6,599,177 B2 7/2003 Nevoret et al.
6,620,214 B2 9/2003 McArdle et al.
6,646,019 B2 11/2003 Perez et al.
6,652,361 B1 11/2003 Gash et al.
6,669,745 B2 12/2003 Prichard et al.
6,685,755 B2 2/2004 Ramanath et al.
6,696,258 B1 2/2004 Wei
6,702,650 B2 3/2004 Adefris
6,737,378 B2 5/2004 Hirosaki et al.
6,749,496 B2 6/2004 Mota et al.
6,750,173 B2 6/2004 Rizkalla
6,752,700 B2 6/2004 Duescher
6,755,729 B2 6/2004 Buljan et al.
6,802,878 B1 10/2004 Monroe
6,821,196 B2 11/2004 Oliver
6,833,014 B2 12/2004 Welygan et al.
6,843,815 B1 1/2005 Thurber et al.
6,846,795 B2 1/2005 Lant et al.
6,878,456 B2 4/2005 Castro et al.
6,881,483 B2 4/2005 McArdle et al.
6,888,360 B1 5/2005 Connell et al.
6,913,824 B2 7/2005 Culler et al.
6,942,561 B2 9/2005 Mota et al.
6,949,128 B2 9/2005 Annen
6,951,504 B2 10/2005 Adefris et al.
6,974,930 B2 12/2005 Jense
7,022,179 B1 4/2006 Dry
7,044,989 B2 5/2006 Welygan et al.
7,112,621 B2 9/2006 Rohrbaugh et al.
7,141,522 B2 11/2006 Rosenflanz et al.
7,168,267 B2 1/2007 Rosenflanz et al.
7,169,198 B2 1/2007 Moeltgen et al.
7,267,604 B2 9/2007 Yoshizawa et al.
7,267,700 B2 9/2007 Collins et al.
7,294,158 B2 11/2007 Welygan et al.
7,297,170 B2 11/2007 Welygan et al.
7,297,402 B2 11/2007 Evans et al.
7,364,788 B2 4/2008 Kishbaugh et al.
7,373,887 B2 5/2008 Jackson
7,384,437 B2 6/2008 Welygan et al.
7,404,832 B2 7/2008 Ohtsubo et al.
7,488,544 B2 2/2009 Schofalvi et al.
7,507,268 B2 3/2009 Rosenflanz
7,553,346 B2 6/2009 Welygan et al.
7,556,558 B2 7/2009 Palmgren
7,560,062 B2 7/2009 Gould et al.
7,560,139 B2 7/2009 Thebault et al.
7,563,293 B2 7/2009 Rosenflanz
7,611,795 B2 11/2009 Aoyama et al.
7,618,684 B2 11/2009 Nesbitt
7,632,434 B2 12/2009 Duescher
7,651,386 B2 1/2010 Sung
7,662,735 B2 2/2010 Rosenflanz et al.
7,666,344 B2 2/2010 Schofalvi et al.
7,666,475 B2 2/2010 Morrison
7,669,658 B2 3/2010 Barron et al.
7,670,679 B2 3/2010 Krishna et al.
7,695,542 B2 4/2010 Drivdahl et al.
7,858,189 B2 12/2010 Wagener et al.
7,867,302 B2 1/2011 Nevoret et al.
7,906,057 B2 3/2011 Zhang et al.
7,968,147 B2 6/2011 Fang et al.
7,972,430 B2 7/2011 Millard et al.
8,021,449 B2 9/2011 Seth et al.
8,034,137 B2 10/2011 Erickson et al.
8,049,136 B2 11/2011 Mase et al.
8,070,556 B2 12/2011 Kumar et al.
8,123,828 B2 2/2012 Culler et al.
8,141,484 B2 3/2012 Ojima et al.
8,142,531 B2 3/2012 Adefris et al.
8,142,532 B2 3/2012 Erickson et al.
8,142,891 B2 3/2012 Culler et al.
8,251,774 B2 8/2012 Joseph et al.
8,256,091 B2 9/2012 Duescher
8,333,360 B2 12/2012 Rule et al.
8,440,602 B2 5/2013 Gonzales et al.
8,440,603 B2 5/2013 Gonzales et al.
8,445,422 B2 5/2013 Gonzales et al.
8,470,759 B2 6/2013 Gonzales et al.
8,480,772 B2 7/2013 Welygan et al.
8,530,682 B2 9/2013 Sachs
8,568,497 B2 10/2013 Sheridan
8,628,597 B2 1/2014 Palmgren et al.
8,783,589 B2 7/2014 Hart et al.
8,852,643 B2 10/2014 Gonzales et al.
8,920,527 B2 12/2014 Seider et al.
8,921,687 B1 12/2014 Welser
9,017,439 B2 4/2015 Yener et al.
9,079,154 B2 7/2015 Rosendahl
9,181,477 B2 11/2015 Collins et al.
9,211,634 B2 12/2015 Rehrig et al.
9,259,726 B2 2/2016 Gopal
9,375,826 B2 6/2016 Tian et al.
9,717,674 B1 8/2017 Guskey et al.
9,758,724 B2 9/2017 Collins et al.
9,982,175 B2 5/2018 Sarangi et al.
D849,066 S 5/2019 Hanschen et al.
D849,067 S 5/2019 Hanschen et al.
10,351,745 B2 7/2019 Josseaux et al.
10,364,383 B2 7/2019 Yener et al.
D862,538 S 10/2019 Hanschen et al.
D870,782 S 12/2019 Hanschen et al.
10,556,323 B2 2/2020 Alkhas et al.
10,557,068 B2 2/2020 Oldenkotte et al.
10,563,105 B2 2/2020 Cotter et al.
10,655,038 B2 5/2020 Martinez et al.
10,710,211 B2 7/2020 Lehuu et al.
10,717,908 B2 7/2020 Hejtmann et al.
11,643,582 B2 5/2023 Bujnowski et al.
12,043,784 B2 * 7/2024 Bauer .................. C04B 35/624
2001/0027623 A1 10/2001 Rosenflanz
2002/0026752 A1 3/2002 Culler et al.
2002/0068518 A1 6/2002 Cesena et al.
2002/0084290 A1 7/2002 Materna
2002/0090891 A1 7/2002 Adefris et al.

(56) References Cited

U.S. PATENT DOCUMENTS

| | | | |
|---|---|---|---|
| 2002/0151265 | A1 | 10/2002 | Adefris |
| 2002/0170236 | A1 | 11/2002 | Larson et al. |
| 2002/0174935 | A1 | 11/2002 | Burdon et al. |
| 2002/0177391 | A1 | 11/2002 | Fritz et al. |
| 2003/0008933 | A1 | 1/2003 | Perez et al. |
| 2003/0022961 | A1 | 1/2003 | Kusaka et al. |
| 2003/0029094 | A1 | 2/2003 | Moeltgen et al. |
| 2003/0085204 | A1 | 5/2003 | Lagos |
| 2003/0109371 | A1 | 6/2003 | Pujari et al. |
| 2003/0110707 | A1 | 6/2003 | Rosenflanz et al. |
| 2003/0126800 | A1 | 7/2003 | Seth et al. |
| 2003/0228738 | A1 | 12/2003 | Beaudoin |
| 2004/0003895 | A1 | 1/2004 | Amano et al. |
| 2004/0148868 | A1 | 8/2004 | Anderson et al. |
| 2004/0148967 | A1 | 8/2004 | Celikkaya et al. |
| 2004/0202844 | A1 | 10/2004 | Wong |
| 2004/0224125 | A1 | 11/2004 | Yamada et al. |
| 2004/0235406 | A1 | 11/2004 | Duescher |
| 2004/0244675 | A1 | 12/2004 | Kishimoto et al. |
| 2005/0020190 | A1 | 1/2005 | Schutz et al. |
| 2005/0022457 | A1 | 2/2005 | Chen et al. |
| 2005/0060941 | A1 | 3/2005 | Provow et al. |
| 2005/0060947 | A1 | 3/2005 | McArdle et al. |
| 2005/0064805 | A1 | 3/2005 | Culler et al. |
| 2005/0081455 | A1 | 4/2005 | Welygan et al. |
| 2005/0118939 | A1 | 6/2005 | Duescher |
| 2005/0132655 | A1 | 6/2005 | Anderson et al. |
| 2005/0218565 | A1 | 10/2005 | DiChiara, Jr. |
| 2005/0223649 | A1 | 10/2005 | O'Gary et al. |
| 2005/0232853 | A1 | 10/2005 | Evans et al. |
| 2005/0245179 | A1 | 11/2005 | Luedeke |
| 2005/0255801 | A1 | 11/2005 | Pollasky |
| 2005/0266221 | A1 | 12/2005 | Karam et al. |
| 2005/0271795 | A1 | 12/2005 | Moini et al. |
| 2005/0284029 | A1 | 12/2005 | Bourlier et al. |
| 2006/0049540 | A1 | 3/2006 | Hui et al. |
| 2006/0126265 | A1 | 6/2006 | Crespi et al. |
| 2006/0135050 | A1 | 6/2006 | Petersen et al. |
| 2006/0177488 | A1 | 8/2006 | Caruso et al. |
| 2006/0185256 | A1 | 8/2006 | Nevoret et al. |
| 2007/0011951 | A1 | 1/2007 | Gaeta et al. |
| 2007/0020457 | A1 | 1/2007 | Adefris |
| 2007/0051355 | A1 | 3/2007 | Sung |
| 2007/0072527 | A1 | 3/2007 | Palmgren |
| 2007/0074456 | A1 | 4/2007 | Orlhac et al. |
| 2007/0087928 | A1 | 4/2007 | Rosenflanz et al. |
| 2007/0234646 | A1 | 10/2007 | Can et al. |
| 2008/0017053 | A1 | 1/2008 | Araumi et al. |
| 2008/0072500 | A1 | 3/2008 | Klett et al. |
| 2008/0098659 | A1 | 5/2008 | Sung |
| 2008/0121124 | A1 | 5/2008 | Sato |
| 2008/0172951 | A1 | 7/2008 | Starling |
| 2008/0176075 | A1 | 7/2008 | Bauer et al. |
| 2008/0179783 | A1 | 7/2008 | Liu et al. |
| 2008/0230951 | A1 | 9/2008 | Dannoux et al. |
| 2008/0233845 | A1 | 9/2008 | Annen et al. |
| 2008/0262577 | A1 | 10/2008 | Altshuler et al. |
| 2008/0271384 | A1 | 11/2008 | Puthanangady et al. |
| 2008/0286590 | A1 | 11/2008 | Besida et al. |
| 2008/0299875 | A1 | 12/2008 | Duescher |
| 2009/0016916 | A1 | 1/2009 | Rosenzweig et al. |
| 2009/0017276 | A1 | 1/2009 | Hoglund et al. |
| 2009/0017736 | A1 | 1/2009 | Block et al. |
| 2009/0098365 | A1 | 4/2009 | Moeltgen |
| 2009/0165394 | A1 | 7/2009 | Culler et al. |
| 2009/0165661 | A1 | 7/2009 | Koenig et al. |
| 2009/0169816 | A1 | 7/2009 | Erickson et al. |
| 2009/0208734 | A1 | 8/2009 | Macfie et al. |
| 2009/0246464 | A1 | 10/2009 | Watanabe et al. |
| 2010/0000159 | A1 | 1/2010 | Walia et al. |
| 2010/0003900 | A1 | 1/2010 | Sakaguchi et al. |
| 2010/0003904 | A1 | 1/2010 | Duescher |
| 2010/0040767 | A1 | 2/2010 | Uibel et al. |
| 2010/0056816 | A1 | 3/2010 | Wallin et al. |
| 2010/0064594 | A1 | 3/2010 | Pakalapati et al. |
| 2010/0068974 | A1 | 3/2010 | Dumm et al. |
| 2010/0146867 | A1 | 6/2010 | Boden et al. |
| 2010/0151195 | A1 | 6/2010 | Culler et al. |
| 2010/0151196 | A1 | 6/2010 | Adefris et al. |
| 2010/0151201 | A1 | 6/2010 | Erickson et al. |
| 2010/0190424 | A1 | 7/2010 | Francois et al. |
| 2010/0201018 | A1 | 8/2010 | Yoshioka et al. |
| 2010/0251625 | A1 | 10/2010 | Gaeta |
| 2010/0292428 | A1 | 11/2010 | Meador et al. |
| 2010/0307067 | A1 | 12/2010 | Sigalas et al. |
| 2010/0319269 | A1 | 12/2010 | Erickson |
| 2010/0330886 | A1 | 12/2010 | Wu et al. |
| 2011/0008604 | A1 | 1/2011 | Boylan |
| 2011/0081848 | A1 | 4/2011 | Chen |
| 2011/0092137 | A1 | 4/2011 | Ohishi et al. |
| 2011/0111563 | A1 | 5/2011 | Yanagi et al. |
| 2011/0124483 | A1 | 5/2011 | Shah et al. |
| 2011/0136659 | A1 | 6/2011 | Allen et al. |
| 2011/0146509 | A1 | 6/2011 | Welygan et al. |
| 2011/0152548 | A1 | 6/2011 | Sachs |
| 2011/0160104 | A1 | 6/2011 | Wu et al. |
| 2011/0244769 | A1 | 10/2011 | David et al. |
| 2011/0289854 | A1 | 12/2011 | Moren et al. |
| 2011/0314746 | A1 | 12/2011 | Erickson et al. |
| 2012/0000135 | A1 | 1/2012 | Eilers et al. |
| 2012/0034847 | A1 | 2/2012 | Besse et al. |
| 2012/0055098 | A1 | 3/2012 | Ramanath et al. |
| 2012/0100366 | A1 | 4/2012 | Dumm et al. |
| 2012/0137597 | A1 | 6/2012 | Adefris et al. |
| 2012/0144754 | A1 | 6/2012 | Culler et al. |
| 2012/0144755 | A1 | 6/2012 | Erickson et al. |
| 2012/0153547 | A1 | 6/2012 | Bauer et al. |
| 2012/0167481 | A1 | 7/2012 | Yener et al. |
| 2012/0168979 | A1 | 7/2012 | Bauer et al. |
| 2012/0227333 | A1 | 9/2012 | Adefris et al. |
| 2012/0231711 | A1 | 9/2012 | Keipert et al. |
| 2012/0308837 | A1 | 12/2012 | Schlechtriemen et al. |
| 2012/0321567 | A1 | 12/2012 | Gonzales et al. |
| 2013/0000212 | A1 | 1/2013 | Wang et al. |
| 2013/0000216 | A1 | 1/2013 | Wang et al. |
| 2013/0009484 | A1 | 1/2013 | Yu |
| 2013/0036402 | A1 | 2/2013 | Mutisya et al. |
| 2013/0045251 | A1 | 2/2013 | Cen et al. |
| 2013/0067669 | A1 | 3/2013 | Gonzales et al. |
| 2013/0072417 | A1 | 3/2013 | Perez-Prat et al. |
| 2013/0074418 | A1 | 3/2013 | Panzarella et al. |
| 2013/0125477 | A1 | 5/2013 | Adefris |
| 2013/0180180 | A1 | 7/2013 | Yener et al. |
| 2013/0186005 | A1 | 7/2013 | Kavanaugh |
| 2013/0186006 | A1 | 7/2013 | Kavanaugh et al. |
| 2013/0199105 | A1 | 8/2013 | Braun et al. |
| 2013/0203328 | A1 | 8/2013 | Givot et al. |
| 2013/0212952 | A1 | 8/2013 | Welygan et al. |
| 2013/0236725 | A1 | 9/2013 | Yener et al. |
| 2013/0255162 | A1 | 10/2013 | Welygan et al. |
| 2013/0260656 | A1 | 10/2013 | Seth et al. |
| 2013/0267150 | A1 | 10/2013 | Seider et al. |
| 2013/0283705 | A1 | 10/2013 | Fischer et al. |
| 2013/0296587 | A1 | 11/2013 | Rosendahl et al. |
| 2013/0305614 | A1 | 11/2013 | Gaeta et al. |
| 2013/0337262 | A1 | 12/2013 | Bauer et al. |
| 2013/0337725 | A1 | 12/2013 | Monroe |
| 2013/0344786 | A1 | 12/2013 | Keipert |
| 2014/0000176 | A1 | 1/2014 | Moren et al. |
| 2014/0007518 | A1 | 1/2014 | Yener et al. |
| 2014/0080393 | A1 | 3/2014 | Ludwig |
| 2014/0106126 | A1 | 4/2014 | Gaeta et al. |
| 2014/0107356 | A1 | 4/2014 | Gopal |
| 2014/0182216 | A1 | 7/2014 | Panzarella et al. |
| 2014/0182217 | A1 | 7/2014 | Yener et al. |
| 2014/0186585 | A1 | 7/2014 | Field, III et al. |
| 2014/0250797 | A1 | 9/2014 | Yener et al. |
| 2014/0256238 | A1 | 9/2014 | Van et al. |
| 2014/0287658 | A1 | 9/2014 | Flaschberger et al. |
| 2014/0290147 | A1 | 10/2014 | Seth et al. |
| 2014/0325917 | A1 | 11/2014 | Braun et al. |
| 2014/0345204 | A1 | 11/2014 | Wang et al. |
| 2014/0345205 | A1 | 11/2014 | Kavanaugh et al. |
| 2014/0352721 | A1 | 12/2014 | Gonzales et al. |

(56) References Cited

U.S. PATENT DOCUMENTS

| | | | |
|---|---|---|---|
| 2014/0352722 A1 | 12/2014 | Gonzales et al. |
| 2014/0357544 A1 | 12/2014 | Gonzales et al. |
| 2014/0378036 A1 | 12/2014 | Cichowlas et al. |
| 2015/0000209 A1 | 1/2015 | Louapre et al. |
| 2015/0000210 A1 | 1/2015 | Breder et al. |
| 2015/0007399 A1 | 1/2015 | Gonzales et al. |
| 2015/0007400 A1 | 1/2015 | Gonzales et al. |
| 2015/0068130 A1 | 3/2015 | Louapre et al. |
| 2015/0089881 A1 | 4/2015 | Stevenson et al. |
| 2015/0126098 A1 | 5/2015 | Eilers et al. |
| 2015/0128505 A1 | 5/2015 | Wang et al. |
| 2015/0183089 A1 | 7/2015 | Iyengar et al. |
| 2015/0209932 A1 | 7/2015 | Lehuu et al. |
| 2015/0218430 A1 | 8/2015 | Yener et al. |
| 2015/0232727 A1 | 8/2015 | Erickson |
| 2015/0267099 A1 | 9/2015 | Panzarella et al. |
| 2015/0291865 A1 | 10/2015 | Breder et al. |
| 2015/0291866 A1 | 10/2015 | Arcona et al. |
| 2015/0291867 A1 | 10/2015 | Breder et al. |
| 2015/0343603 A1 | 12/2015 | Breder et al. |
| 2016/0053151 A1 | 2/2016 | Bauer et al. |
| 2016/0090516 A1 | 3/2016 | Yener et al. |
| 2016/0107290 A1 | 4/2016 | Bajaj et al. |
| 2016/0177152 A1 | 6/2016 | Braun |
| 2016/0177153 A1 | 6/2016 | Josseaux |
| 2016/0177154 A1 | 6/2016 | Josseaux et al. |
| 2016/0186028 A1 | 6/2016 | Louapre et al. |
| 2016/0214903 A1 | 7/2016 | Humpal et al. |
| 2016/0289520 A1 | 10/2016 | Bujnowski et al. |
| 2016/0289521 A1 | 10/2016 | Colet et al. |
| 2016/0298013 A1 | 10/2016 | Bock et al. |
| 2016/0303704 A1 | 10/2016 | Chou et al. |
| 2016/0303705 A1 | 10/2016 | Chou et al. |
| 2016/0304760 A1 | 10/2016 | Bock et al. |
| 2016/0311081 A1 | 10/2016 | Culler et al. |
| 2016/0311084 A1 | 10/2016 | Culler et al. |
| 2016/0326416 A1 | 11/2016 | Bauer et al. |
| 2016/0340564 A1 | 11/2016 | Louapre et al. |
| 2016/0354898 A1 | 12/2016 | Nienaber et al. |
| 2016/0362589 A1 | 12/2016 | Bauer et al. |
| 2016/0375556 A1 | 12/2016 | Seth et al. |
| 2017/0015886 A1 | 1/2017 | Braun et al. |
| 2017/0028531 A1 | 2/2017 | Gaeta et al. |
| 2017/0050293 A1 | 2/2017 | Gaeta et al. |
| 2017/0066099 A1 | 3/2017 | Nakamura |
| 2017/0114260 A1 | 4/2017 | Bock et al. |
| 2017/0129075 A1 | 5/2017 | Thurber et al. |
| 2017/0145274 A1 | 5/2017 | Yener et al. |
| 2017/0158930 A1 | 6/2017 | Iyengar |
| 2017/0225299 A1 | 8/2017 | Keipert et al. |
| 2017/0247592 A1 | 8/2017 | Bauer et al. |
| 2017/0335155 A1 | 11/2017 | Czerepinski et al. |
| 2017/0335156 A1 | 11/2017 | Bauer et al. |
| 2017/0342303 A1 | 11/2017 | Stevenson et al. |
| 2017/0349797 A1 | 12/2017 | Yener et al. |
| 2018/0002584 A1 | 1/2018 | Yener et al. |
| 2018/0086957 A1 | 3/2018 | Sahlin et al. |
| 2018/0155592 A1 | 6/2018 | Josseaux et al. |
| 2018/0161960 A1 | 6/2018 | Wilson et al. |
| 2018/0169837 A1 | 6/2018 | Liu |
| 2018/0187057 A1 | 7/2018 | Bujnowski et al. |
| 2018/0215975 A1 | 8/2018 | Marazano et al. |
| 2018/0215976 A1 | 8/2018 | Cotter et al. |
| 2018/0237675 A1 | 8/2018 | Yener et al. |
| 2018/0318983 A1 | 11/2018 | Wilson et al. |
| 2018/0327644 A1 | 11/2018 | Bauer et al. |
| 2018/0370857 A1 | 12/2018 | Marlin et al. |
| 2019/0022826 A1 | 1/2019 | Franke et al. |
| 2019/0030684 A1 | 1/2019 | Van et al. |
| 2019/0091835 A1 | 3/2019 | Culler et al. |
| 2019/0119540 A1 | 4/2019 | Colet et al. |
| 2019/0126436 A1 | 5/2019 | Westberg et al. |
| 2019/0160630 A1 | 5/2019 | Jiang et al. |
| 2019/0217442 A1 | 7/2019 | Gaeta et al. |
| 2019/0249052 A1 | 8/2019 | Eckel et al. |
| 2019/0270182 A1 | 9/2019 | Eckel et al. |
| 2019/0284461 A1 | 9/2019 | Josseaux et al. |
| 2019/0309201 A1 | 10/2019 | Dumont et al. |
| 2019/0322915 A1 | 10/2019 | Jiwpanich et al. |
| 2019/0330505 A1 | 10/2019 | Bujnowski et al. |
| 2019/0337124 A1 | 11/2019 | Liu et al. |
| 2019/0338172 A1 | 11/2019 | Erickson et al. |
| 2019/0338173 A1 | 11/2019 | Yener et al. |
| 2019/0351531 A1 | 11/2019 | Nelson et al. |
| 2019/0358776 A1 | 11/2019 | Seth et al. |
| 2019/0366511 A1 | 12/2019 | Huber |
| 2019/0382637 A1 | 12/2019 | Braun et al. |
| 2020/0139512 A1 | 5/2020 | Culler et al. |
| 2020/0148927 A1 | 5/2020 | Arcona et al. |
| 2020/0156215 A1 | 5/2020 | Jusuf et al. |
| 2020/0157396 A1 | 5/2020 | Cotter et al. |
| 2020/0157397 A1 | 5/2020 | Stevenson et al. |
| 2020/0199426 A1 | 6/2020 | Yener et al. |
| 2020/0262031 A1 | 8/2020 | Seth et al. |
| 2020/0308462 A1 | 10/2020 | Bauer et al. |
| 2020/0391354 A1 | 12/2020 | Marazano et al. |
| 2021/0024798 A1 | 1/2021 | Czerepinski et al. |
| 2021/0087444 A1 | 3/2021 | Stevenson et al. |
| 2021/0087445 A1 | 3/2021 | Cotter et al. |
| 2021/0108117 A1 | 4/2021 | Bauer et al. |
| 2021/0108118 A1 | 4/2021 | Yener et al. |
| 2021/0130667 A1 | 5/2021 | Arcona et al. |
| 2021/0197339 A1 | 7/2021 | Marlin et al. |
| 2021/0198544 A1 | 7/2021 | Marlin et al. |
| 2021/0198545 A1 | 7/2021 | Marlin et al. |
| 2021/0332278 A1 | 10/2021 | Iyengar |
| 2021/0395587 A1 | 12/2021 | Yener et al. |
| 2022/0001512 A1 | 1/2022 | Gaeta et al. |
| 2022/0025237 A1 | 1/2022 | Sahlin et al. |
| 2023/0061952 A1 | 3/2023 | Lentz et al. |
| 2023/0065541 A1 | 3/2023 | Colet et al. |
| 2023/0096577 A1 | 3/2023 | Cotter et al. |
| 2023/0135441 A1 | 5/2023 | Seth et al. |
| 2023/0193100 A1 | 6/2023 | Josseaux et al. |
| 2023/0211466 A1 | 7/2023 | Martone et al. |
| 2023/0211467 A1 | 7/2023 | Martone et al. |
| 2023/0211468 A1 | 7/2023 | Martone et al. |
| 2023/0220255 A1 | 7/2023 | Yuyang et al. |
| 2023/0220256 A1 | 7/2023 | Bujnowski et al. |
| 2023/0265326 A1 | 8/2023 | Adefris |
| 2023/0272254 A1 | 8/2023 | Yener et al. |
| 2023/0294247 A1 | 9/2023 | Liu et al. |
| 2023/0332030 A1 | 10/2023 | Bauer et al. |
| 2023/0357617 A9 | 11/2023 | Yener et al. |
| 2024/0116153 A1 | 4/2024 | Martone et al. |
| 2024/0123574 A1 | 4/2024 | Martone et al. |
| 2024/0141219 A1 | 5/2024 | Bauer et al. |
| 2024/0198488 A1 | 6/2024 | Marlin et al. |
| 2024/0218224 A1 | 7/2024 | Fan et al. |
| 2024/0218225 A1 | 7/2024 | Cotter et al. |
| 2024/0254376 A1 | 8/2024 | Josseaux et al. |

FOREIGN PATENT DOCUMENTS

| | | | |
|---|---|---|---|
| CH | 685051 | A5 | 3/1995 |
| CN | 1229007 | A | 7/2005 |
| CN | 1774488 | A | 5/2006 |
| CN | 101389466 | A | 3/2009 |
| CN | 101970347 | A | 2/2011 |
| CN | 101980836 | A | 2/2011 |
| CN | 102281992 | A | 12/2011 |
| CN | 103189164 | A | 7/2013 |
| CN | 103842132 | A | 6/2014 |
| CN | 102123837 | B | 7/2014 |
| CN | 104125875 | A | 10/2014 |
| CN | 104994995 | A | 10/2015 |
| CN | 105622071 | A | 6/2016 |
| CN | 105713568 | | 6/2016 |
| DE | 3923671 | C2 | 2/1998 |
| DE | 102012023688 | A1 | 4/2014 |
| DE | 202014101739 | U1 | 6/2014 |
| DE | 202014101741 | U1 | 6/2014 |
| DE | 102013202204 | A1 | 8/2014 |
| DE | 102013210158 | A1 | 12/2014 |

(56) References Cited

FOREIGN PATENT DOCUMENTS

| | | | |
|---|---|---|---|
| DE | 102013210716 | A1 | 12/2014 |
| DE | 102013212598 | A1 | 12/2014 |
| DE | 102013212622 | A1 | 12/2014 |
| DE | 102013212634 | A1 | 12/2014 |
| DE | 102013212639 | A1 | 12/2014 |
| DE | 102013212644 | A1 | 12/2014 |
| DE | 102013212653 | A1 | 12/2014 |
| DE | 102013212654 | A1 | 12/2014 |
| DE | 102013212661 | A1 | 12/2014 |
| DE | 102013212666 | A1 | 12/2014 |
| DE | 102013212677 | A1 | 12/2014 |
| DE | 102013212680 | A1 | 12/2014 |
| DE | 102013212687 | A1 | 12/2014 |
| DE | 102013212690 | A1 | 12/2014 |
| DE | 102013212700 | A1 | 12/2014 |
| DE | 102014210836 | A1 | 12/2014 |
| EP | 0078896 | A2 | 5/1983 |
| EP | 0152768 | A2 | 8/1985 |
| EP | 0293163 | A2 | 11/1988 |
| EP | 0480133 | A2 | 4/1992 |
| EP | 0652919 | A1 | 5/1995 |
| EP | 0662110 | A1 | 7/1995 |
| EP | 0500369 | B1 | 1/1996 |
| EP | 0609864 | B1 | 11/1996 |
| EP | 0771769 | | 5/1997 |
| EP | 0812456 | B1 | 12/1997 |
| EP | 0651778 | B1 | 5/1998 |
| EP | 0614861 | B1 | 5/2001 |
| EP | 0931032 | B1 | 7/2001 |
| EP | 0833803 | | 8/2001 |
| EP | 1207015 | A2 | 5/2002 |
| EP | 1356152 | A2 | 10/2003 |
| EP | 1371451 | A1 | 12/2003 |
| EP | 1383631 | A1 | 1/2004 |
| EP | 1015181 | B1 | 3/2004 |
| EP | 1492845 | A1 | 1/2005 |
| EP | 1851007 | | 11/2007 |
| EP | 1960157 | A1 | 8/2008 |
| EP | 2176031 | A1 | 4/2010 |
| EP | 2184134 | A1 | 5/2010 |
| EP | 2242618 | A2 | 10/2010 |
| EP | 2390056 | A2 | 11/2011 |
| EP | 1800801 | B1 | 3/2012 |
| EP | 2445982 | A2 | 5/2012 |
| EP | 2507016 | A2 | 10/2012 |
| EP | 2537917 | A1 | 12/2012 |
| EP | 2567784 | A1 | 3/2013 |
| EP | 2631286 | A1 | 8/2013 |
| EP | 2692813 | A1 | 2/2014 |
| EP | 2692814 | A1 | 2/2014 |
| EP | 2692815 | A1 | 2/2014 |
| EP | 2692816 | A1 | 2/2014 |
| EP | 2692817 | A1 | 2/2014 |
| EP | 2692818 | A1 | 2/2014 |
| EP | 2692819 | A1 | 2/2014 |
| EP | 2692820 | A1 | 2/2014 |
| EP | 2692821 | A1 | 2/2014 |
| EP | 2719752 | A1 | 4/2014 |
| EP | 2012972 | B1 | 6/2014 |
| EP | 2720676 | B1 | 1/2018 |
| EP | 3319758 | A1 | 5/2018 |
| EP | 3342839 | A1 | 7/2018 |
| EP | 3444313 | B1 | 7/2020 |
| EP | 3830211 | A1 | 6/2021 |
| FR | 2354373 | A1 | 1/1978 |
| GB | 986847 | A | 3/1965 |
| GB | 1456765 | A | 11/1976 |
| GB | 1466054 | | 3/1977 |
| JP | 53064890 | A | 6/1978 |
| JP | 60-006356 | U | 1/1985 |
| JP | 62002946 | B | 1/1987 |
| JP | 63036905 | B | 7/1988 |
| JP | 03079277 | A | 4/1991 |
| JP | 03-287687 | | 12/1991 |
| JP | 05285833 | A | 11/1993 |
| JP | 06114739 | A | 4/1994 |
| JP | 07008474 | B2 | 2/1995 |
| JP | 3030861 | U | 8/1996 |
| JP | 10113875 | A | 5/1998 |
| JP | 2779252 | B2 | 7/1998 |
| JP | 10330734 | A | 12/1998 |
| JP | H10315142 | A | 12/1998 |
| JP | 2957492 | B2 | 10/1999 |
| JP | 2000091280 | A | 3/2000 |
| JP | 2000-336344 | A | 12/2000 |
| JP | 2000354967 | A | 12/2000 |
| JP | 3160084 | B2 | 4/2001 |
| JP | 2001162541 | A | 6/2001 |
| JP | 3194269 | B2 | 7/2001 |
| JP | 2001180930 | A | 7/2001 |
| JP | 2001207160 | A | 7/2001 |
| JP | 2001516652 | A | 10/2001 |
| JP | 2002-038131 | A | 2/2002 |
| JP | 2002210659 | A | 7/2002 |
| JP | 2003-049158 | A | 2/2003 |
| JP | 2004-510873 | A | 4/2004 |
| JP | 2004209624 | A | 7/2004 |
| JP | 2006130586 | A | 5/2006 |
| JP | 2006130636 | A | 5/2006 |
| JP | 2006159402 | A | 6/2006 |
| JP | 2006-192540 | A | 7/2006 |
| JP | 2006224201 | A | 8/2006 |
| JP | 2007-537891 | A | 12/2007 |
| JP | 2008132560 | A | 6/2008 |
| JP | 2008194761 | A | 8/2008 |
| JP | 2008531305 | A | 8/2008 |
| JP | 2012512046 | A | 5/2012 |
| JP | 2012512047 | A | 5/2012 |
| JP | 2012512048 | A | 5/2012 |
| JP | 2012530615 | A | 12/2012 |
| JP | 5238725 | B2 | 7/2013 |
| JP | 5238726 | B2 | 7/2013 |
| JP | 2014503367 | A | 2/2014 |
| JP | 2017518889 | A | 7/2017 |
| JP | 2017538588 | A | 12/2017 |
| JP | 2018510073 | A | 4/2018 |
| KR | 1019890014409 | A | 10/1989 |
| KR | 1020020042840 | A | 6/2002 |
| KR | 20140106713 | A | 9/2014 |
| NL | 171464 | B1 | 11/1982 |
| WO | 94/02559 | A1 | 2/1994 |
| WO | 95/03370 | | 2/1995 |
| WO | 1995016756 | A1 | 6/1995 |
| WO | 1995017287 | A1 | 6/1995 |
| WO | 95/18192 | A1 | 7/1995 |
| WO | 95/20469 | A1 | 8/1995 |
| WO | 1996012776 | A1 | 5/1996 |
| WO | 1996014964 | A1 | 5/1996 |
| WO | 96/27189 | A1 | 9/1996 |
| WO | 9711484 | A1 | 3/1997 |
| WO | 97/14536 | A1 | 4/1997 |
| WO | 99/06500 | A1 | 2/1999 |
| WO | 99/14016 | A1 | 3/1999 |
| WO | 99/38817 | A1 | 8/1999 |
| WO | 1999038817 | A1 | 8/1999 |
| WO | 99/54424 | A1 | 10/1999 |
| WO | 0064630 | A1 | 11/2000 |
| WO | 0114494 | A1 | 3/2001 |
| WO | 0123323 | A1 | 4/2001 |
| WO | 02097150 | A2 | 12/2002 |
| WO | 03087236 | A1 | 10/2003 |
| WO | 2005080624 | A1 | 9/2005 |
| WO | 2005112601 | A2 | 12/2005 |
| WO | 2006027593 | A3 | 3/2006 |
| WO | 2006062597 | A1 | 6/2006 |
| WO | 2007041538 | A1 | 4/2007 |
| WO | 2009085578 | A2 | 7/2009 |
| WO | 2009085841 | A2 | 7/2009 |
| WO | 2009098017 | A1 | 8/2009 |
| WO | 2010077509 | A1 | 7/2010 |
| WO | 2010085587 | A1 | 7/2010 |
| WO | 2010118440 | A2 | 10/2010 |
| WO | 2010151201 | A1 | 12/2010 |
| WO | 2011005425 | A2 | 1/2011 |

(56) References Cited

FOREIGN PATENT DOCUMENTS

| | | | |
|---|---|---|---|
| WO | 2011019188 | A1 | 2/2011 |
| WO | 2011068714 | A2 | 6/2011 |
| WO | 2011068724 | A2 | 6/2011 |
| WO | 2011087649 | A2 | 7/2011 |
| WO | 2011109188 | A2 | 9/2011 |
| WO | 2011133438 | A1 | 10/2011 |
| WO | 2011139562 | A2 | 11/2011 |
| WO | 2011149625 | A2 | 12/2011 |
| WO | 2012018903 | A2 | 2/2012 |
| WO | 2012061016 | A1 | 5/2012 |
| WO | 2012061033 | A2 | 5/2012 |
| WO | 2012092590 | A2 | 7/2012 |
| WO | 2012092605 | A3 | 7/2012 |
| WO | 2010070294 | A1 | 8/2012 |
| WO | 2012112305 | A2 | 8/2012 |
| WO | 2012112322 | A2 | 8/2012 |
| WO | 2012092590 | A3 | 10/2012 |
| WO | 2012140617 | A1 | 10/2012 |
| WO | 2012141905 | A2 | 10/2012 |
| WO | 2013003830 | A2 | 1/2013 |
| WO | 2013003831 | A2 | 1/2013 |
| WO | 2013009484 | A2 | 1/2013 |
| WO | 2013036402 | A1 | 3/2013 |
| WO | 2013040423 | A2 | 3/2013 |
| WO | 2013045251 | A1 | 4/2013 |
| WO | 2013049239 | A1 | 4/2013 |
| WO | 2013070576 | A2 | 5/2013 |
| WO | 2013101575 | A1 | 7/2013 |
| WO | 2013102170 | A1 | 7/2013 |
| WO | 2013102176 | A1 | 7/2013 |
| WO | 2013102177 | A1 | 7/2013 |
| WO | 2013106597 | A1 | 7/2013 |
| WO | 2013106602 | A1 | 7/2013 |
| WO | 2013149209 | A1 | 10/2013 |
| WO | 2013151745 | A1 | 10/2013 |
| WO | 2013177446 | A1 | 11/2013 |
| WO | 2013186146 | A1 | 12/2013 |
| WO | 2013188038 | A1 | 12/2013 |
| WO | 2014005120 | A1 | 1/2014 |
| WO | 2014020068 | A1 | 2/2014 |
| WO | 2014020075 | A1 | 2/2014 |
| WO | 2014022453 | A1 | 2/2014 |
| WO | 2014022462 | A1 | 2/2014 |
| WO | 2014022465 | A1 | 2/2014 |
| WO | 2014161001 | A1 | 2/2014 |
| WO | 2014057273 | A1 | 4/2014 |
| WO | 2014062701 | A1 | 4/2014 |
| WO | 2014070468 | A1 | 5/2014 |
| WO | 2014106173 | A1 | 7/2014 |
| WO | 2014106211 | A1 | 7/2014 |
| WO | 2014124554 | A1 | 8/2014 |
| WO | 2014137972 | A1 | 9/2014 |
| WO | 2014140689 | A1 | 9/2014 |
| WO | 2014165390 | A1 | 10/2014 |
| WO | 2014176108 | A1 | 10/2014 |
| WO | 2014206739 | A1 | 12/2014 |
| WO | 2014206890 | A1 | 12/2014 |
| WO | 2014206967 | A1 | 12/2014 |
| WO | 2014209567 | A1 | 12/2014 |
| WO | 2014210160 | A1 | 12/2014 |
| WO | 2014210442 | A1 | 12/2014 |
| WO | 2014210532 | A1 | 12/2014 |
| WO | 2014210568 | A1 | 12/2014 |
| WO | 2015050781 | A1 | 4/2015 |
| WO | 2015073346 | A1 | 5/2015 |
| WO | 2015048768 | A9 | 6/2015 |
| WO | 2015088953 | A1 | 6/2015 |
| WO | 2015089527 | A1 | 6/2015 |
| WO | 2015089528 | A1 | 6/2015 |
| WO | 2015089529 | A1 | 6/2015 |
| WO | 2015100018 | A1 | 7/2015 |
| WO | 2015100020 | A1 | 7/2015 |
| WO | 2015100220 | A1 | 7/2015 |
| WO | 2015102992 | A1 | 7/2015 |
| WO | 2015112379 | A1 | 7/2015 |
| WO | 2015130487 | A1 | 9/2015 |
| WO | 2015143461 | A1 | 10/2015 |
| WO | 2015158009 | A1 | 10/2015 |
| WO | 2015160854 | A1 | 10/2015 |
| WO | 2015160855 | A1 | 10/2015 |
| WO | 2015160857 | A1 | 10/2015 |
| WO | 2015164211 | A1 | 10/2015 |
| WO | 2015165122 | A1 | 11/2015 |
| WO | 2015167910 | A1 | 11/2015 |
| WO | 2015179335 | A1 | 11/2015 |
| WO | 2015180005 | A1 | 12/2015 |
| WO | 2015184355 | A1 | 12/2015 |
| WO | 2016028683 | A1 | 2/2016 |
| WO | 2016044158 | A1 | 3/2016 |
| WO | 2016064726 | A1 | 4/2016 |
| WO | 2016089675 | A1 | 6/2016 |
| WO | 2016105469 | A1 | 6/2016 |
| WO | 2016105474 | A1 | 6/2016 |
| WO | 2016160357 | A1 | 10/2016 |
| WO | 2016161157 | A1 | 10/2016 |
| WO | 2016161170 | A1 | 10/2016 |
| WO | 2016167967 | A1 | 10/2016 |
| WO | 2016187570 | A1 | 11/2016 |
| WO | 2016196795 | A1 | 12/2016 |
| WO | 2016201104 | A1 | 12/2016 |
| WO | 2016205133 | A1 | 12/2016 |
| WO | 2016205267 | A1 | 12/2016 |
| WO | 2016210057 | A1 | 12/2016 |
| WO | 2017007703 | A1 | 1/2017 |
| WO | 2017007714 | A1 | 1/2017 |
| WO | 2017062482 | A1 | 4/2017 |
| WO | 2017083249 | A1 | 5/2017 |
| WO | 2017083255 | A1 | 5/2017 |
| WO | 2016105543 | A9 | 9/2017 |
| WO | 2017151498 | A1 | 9/2017 |
| WO | 2017197002 | A1 | 11/2017 |
| WO | 2017197006 | A1 | 11/2017 |
| WO | 2018010730 | A2 | 1/2018 |
| WO | 2018026669 | A1 | 2/2018 |
| WO | 2018057465 | A1 | 3/2018 |
| WO | 2018057558 | A1 | 3/2018 |
| WO | 2018063902 | A1 | 4/2018 |
| WO | 2018063958 | A1 | 4/2018 |
| WO | 2018063960 | A1 | 4/2018 |
| WO | 2018063962 | A1 | 4/2018 |
| WO | 2018064642 | A1 | 4/2018 |
| WO | 2018080703 | A1 | 5/2018 |
| WO | 2018080704 | A1 | 5/2018 |
| WO | 2018080705 | A1 | 5/2018 |
| WO | 2018080755 | A1 | 5/2018 |
| WO | 2018080756 | A1 | 5/2018 |
| WO | 2018080765 | A1 | 5/2018 |
| WO | 2018080778 | A1 | 5/2018 |
| WO | 2018080784 | A1 | 5/2018 |
| WO | 2018081246 | A1 | 5/2018 |
| WO | 2018118688 | A1 | 6/2018 |
| WO | 2018118690 | A1 | 6/2018 |
| WO | 2018118695 | A1 | 6/2018 |
| WO | 2018118699 | A1 | 6/2018 |
| WO | 2018134732 | A1 | 7/2018 |
| WO | 2018136268 | A1 | 7/2018 |
| WO | 2018136269 | A1 | 7/2018 |
| WO | 2018136271 | A1 | 7/2018 |
| WO | 2018172193 | A1 | 9/2018 |
| WO | 2018207145 | A1 | 11/2018 |
| WO | 2018226912 | A1 | 12/2018 |
| WO | 2018236989 | A1 | 12/2018 |
| WO | 2019001908 | A1 | 1/2019 |
| WO | 2019069157 | A1 | 4/2019 |
| WO | 2019102312 | A1 | 5/2019 |
| WO | 2019102328 | A1 | 5/2019 |
| WO | 2019102329 | A1 | 5/2019 |
| WO | 2019102330 | A1 | 5/2019 |
| WO | 2019102331 | A1 | 5/2019 |
| WO | 2019108805 | A2 | 6/2019 |
| WO | 2021161129 | A1 | 8/2019 |
| WO | 2019167022 | A1 | 9/2019 |
| WO | 2019197948 | A1 | 10/2019 |
| WO | 2019207415 | A1 | 10/2019 |

(56) References Cited

FOREIGN PATENT DOCUMENTS

| | | | |
|---|---|---|---|
| WO | 2019207416 | A1 | 10/2019 |
| WO | 2019207417 | A1 | 10/2019 |
| WO | 2019207423 | A1 | 10/2019 |
| WO | 2019215571 | A1 | 11/2019 |
| WO | 2020025270 | A1 | 2/2020 |
| WO | 2020035764 | A1 | 2/2020 |
| WO | 2020075005 | A1 | 4/2020 |
| WO | 2020079522 | A1 | 4/2020 |
| WO | 2020084382 | A1 | 4/2020 |
| WO | 2020084483 | A1 | 4/2020 |
| WO | 2020089741 | A1 | 5/2020 |
| WO | 2020115685 | A1 | 6/2020 |
| WO | 2020128708 | A1 | 6/2020 |
| WO | 2020128716 | A1 | 6/2020 |
| WO | 2020128717 | A1 | 6/2020 |
| WO | 2020128719 | A1 | 6/2020 |
| WO | 2020128720 | A2 | 6/2020 |
| WO | 2020128752 | A1 | 6/2020 |
| WO | 2020128779 | A2 | 6/2020 |
| WO | 2020128780 | A1 | 6/2020 |
| WO | 2020128781 | A1 | 6/2020 |
| WO | 2020128783 | A1 | 6/2020 |
| WO | 2020128787 | A1 | 6/2020 |
| WO | 2020128794 | A1 | 6/2020 |
| WO | 2020128833 | A1 | 6/2020 |
| WO | 2020128838 | A1 | 6/2020 |
| WO | 2020128842 | A1 | 6/2020 |
| WO | 2020128844 | A1 | 6/2020 |
| WO | 2020128845 | A1 | 6/2020 |
| WO | 2020128852 | A1 | 6/2020 |
| WO | 2020128853 | A1 | 6/2020 |
| WO | 2020128856 | A1 | 6/2020 |
| WO | 2020212788 | A1 | 10/2020 |
| WO | 2021009600 | A1 | 1/2021 |
| WO | 2021014271 | A1 | 1/2021 |
| WO | 2021074756 | A1 | 4/2021 |
| WO | 2021074768 | A1 | 4/2021 |
| WO | 2021079331 | A1 | 4/2021 |
| WO | 2021081571 | A1 | 5/2021 |
| WO | 2021105030 | A1 | 6/2021 |
| WO | 2021116883 | A1 | 6/2021 |
| WO | 2021133876 | A1 | 7/2021 |
| WO | 2021133888 | A1 | 7/2021 |
| WO | 2021133901 | A1 | 7/2021 |
| WO | 2021137092 | A1 | 7/2021 |
| WO | 2021179025 | A1 | 9/2021 |
| WO | 2021186326 | A1 | 9/2021 |
| WO | 2021214576 | A1 | 10/2021 |
| WO | 2021214605 | A1 | 10/2021 |
| WO | 2021234540 | A1 | 11/2021 |
| WO | 2022022905 | A1 | 2/2022 |
| WO | 2022022906 | A1 | 2/2022 |
| WO | 2022229744 | A1 | 11/2022 |
| WO | 2023130051 | A1 | 7/2023 |
| WO | 2023130052 | A1 | 7/2023 |
| WO | 2023130053 | A1 | 7/2023 |
| WO | 2023209518 | A1 | 11/2023 |
| WO | 2024127255 | A1 | 6/2024 |
| WO | 2024145523 | A1 | 7/2024 |
| WO | 2025145042 | A | 7/2025 |
| WO | 2025145042 | A1 | 7/2025 |

OTHER PUBLICATIONS

Austin, Benson M., "Thick-Film Screen Printing," Solid State Technology, Jun. 1969, pp. 53-58.

Avril, Nicolas Joseph "Manufacturing Glass-Fiber Reinforcement for Grinding Wheels" Massachusetts Institute of Technology, Feb. 1996, 105 pages.

Bacher, Rudolph J., "High Resolution Thick Film Printing," E.I. du Pont de Nemours & Company, Inc., Proceedings of the International Symposium on Microelectronics, 1986, pp. 576-581.

Besse, John R., "Understanding and controlling wheel truing and dressing forces when rotary plunge dressing," Cutting Tool Engineering, Jun. 2012, vol. 64, Issue 6, 4 pages.

Ciccotti, M. et al., "Complex dynamics in the peeling of an adhesive tape," International Journal of Adhesion & Adhesives 24 (2004) pp. 143-151.

Dupont, "Kevlar Aramid Pulp", Copyright 2011, DuPont, Accessed: Sep. 18, 2013, 2 pages.

Wu, J. et al., "Friction and Wear Properties of Kevlar Pulp Reinforced Epoxy Composite under Dry Sliding Condition", Tribology Letters, vol. 22, No. 3, Jun. 2006, pp. 259-263, Abstract only.

J. European Ceramic Society 31 (2011) 2073-2081, Abstract only.

Riemer, Dietrich E., "Analytical Engineering Model of the Screen Printing Process: Part II," Solid State Technology, Sep. 1988, pp. 85-90.

Miller, L.F., "Paste Transfer in the Screening Process," Solid State Technology, Jun. 1969, pp. 46-52.

Morgan, P. et al., "Ceramic Composites of Monazite and Alumina," J. Am. Ceram. Soc., 78, 1995, 1553-63.

Riemer, Dietrich E., "Analytical Engineering Model of the Screen Printing Process: Part I," Solid State Technology, Aug. 1988, pp. 107-111.

Winter Catalogue No. 5, Dressing tools, Winter diamond tools for dressing grinding wheels, Edition Year: 2010, 140 pages.

Badger, Jeffrey, "Evaluation of Triangular, Engineered-Shape Ceramic Abrasive in Cutting Discs," Supplement to the Welding Journal, Apr. 2014, vol. 93, pp. 107-s to 115-s.

3M Cubitron II Abrasive Belts Brochure, Shaping the Future, Jan. 2011, 6 pages.

Vanstrum et al., Precisely Shaped Grain (PSG): 3M's Innovation in Abrasive Grain Technology, 1 page.

Graf, "Cubitron II: Precision-Shaped Grain (PSG) Turns the Concept of Gear Grinding Upside Down," gearsolutions.com, May 2014, pp. 36-44.

DOW Machine Tool Accessories, Grinding & Surface Finishing, www.1mta.com, Nov. 2014, 72 pages.

VSM Actirox Fibre Discs, The Latest Generation of Abrasives for Maximum Stock Removal [PDF] VSM Abrasives Ltd., Apr. 2019 [retrieved on May 15, 2019], 8 pages. Retrieved from https://uk.vsmabrasives.com/fileadmin/user_upload/ACTIROX/VSM-ACTIROX-EN.pdf.

Kumar et al., "Composites by rapid prototyping technology", Material & Design, Feb. 2010, vol. 31, Issue 2, pp. 850-856.

Lewis et al., "Direct Ink Writing of Three-Dimensional Ceramic Structures", Journal of the American Ceramic Society, US, Nov. 30, 2006, vol. 89, Issue 12, pp. 3599-3609.

International Search Report with regard to International application No. PCT/US2017/031998, dated Aug. 21, 2017.

International Search Report with regard to International application No. PCT/US2017/031992, dated Aug. 21, 2017.

International Search Report and Written Opinion for Application No. PCT/US2016/036701, dated Sep. 1, 2016, 12 pages.

Brewer, L. et al., Journal of Materials Research, 1999, vol. 14, No. 10, pp. 3907-3912, Abstract only.

Lewis et al., "Direct Ink Writing of 3D Functional Materials", Advanced Functional Materials, 2006, 16, pp. 2193-2204.

International Search Report and Written Opinion for Application No. PCT/US2020/066817, mailed Apr. 15, 2021, 11 pages.

International Search Report and Written Opinion for Application No. PCT/US2014/058378, mailed Jan. 29, 2015, 18 pages.

International Search Report and Written Opinion for Application No. PCT/US2015/025825) mailed Jul. 16, 2015, 13 pages.

International Search Report and Written Opinion for PCT/US2023/086306 dated Apr. 25, 2024, 12 pages.

Rowenhorst 3D scans, Nov. 22, 1994, 30 pages.

International Search Report and Written Opinion for PCT/US2020/066801 dated Apr. 2, 2021, 9 pages.

International Search Report and Written Opinion for PCT/US2015/000190 dated Dec. 23, 2015, 13 pages.

* cited by examiner

SHAPED ABRASIVE PARTICLES AND METHODS OF FORMING SAME

CROSS-REFERENCE TO RELATED APPLICATION

This application is a continuation of U.S. patent application Ser. No. 15/975,549, entitled "SHAPED ABRASIVE PARTICLES AND METHODS OF FORMING SAME," by Bauer et al., filed May 9, 2018, which is a continuation of U.S. patent application Ser. No. 15/592,430, entitled "SHAPED ABRASIVE PARTICLES AND METHODS OF FORMING SAME," by Bauer et al., filed May 11, 2017, now U.S. Pat. No. 10,000,676, issued Jun. 10, 2018, which is a continuation of U.S. patent application Ser. No. 15/213,758, entitled "SHAPED ABRASIVE PARTICLES AND METHODS OF FORMING SAME," by Bauer et al., filed Jul. 19, 2016, now U.S. Pat. No. 9,688,893 issued Jun. 27, 2017 which is a continuation of U.S. patent application Ser. No. 14/925,191, entitled "SHAPED ABRASIVE PARTICLES AND METHODS OF FORMING SAME," by Bauer et al., filed Oct. 28, 2015, now U.S. Pat. No. 9,428,681, issued Aug. 30, 2016, which is a continuation of U.S. patent application Ser. No. 13/901,362, entitled "SHAPED ABRASIVE PARTICLES AND METHODS OF FORMING SAME," by Bauer et al., filed May 23, 2013, now U.S. Pat. No. 9,200,187, issued Dec. 1, 2015, which claims priority under 35 U.S.C. § 119 (c) to U.S. Patent Application No. 61/650,673 entitled "SHAPED ABRASIVE PARTICLES AND METHODS OF FORMING SAME," by Bauer et al., filed May 23, 2012, which are assigned to the current assignee hereof and incorporated herein by reference in their entireties.

BACKGROUND

Field of the Disclosure

The following is directed to shaped abrasive particles, and more particularly, to a process of forming shaped abrasive particles and the resulting particles.

Description of the Related Art

Abrasive articles incorporating abrasive particles are useful for various material removal operations including grinding, finishing, polishing, and the like. Depending upon the type of abrasive material, such abrasive particles can be useful in shaping or grinding various materials in the manufacturing of goods. Certain types of abrasive particles have been formulated to date that have particular geometries, such as triangular shaped abrasive particles and abrasive articles incorporating such objects. See, for example, U.S. Pat. Nos. 5,201,916; 5,366,523; and 5,984,988.

Previously, three basic technologies that have been employed to produce abrasive particles having a specified shape, which are fusion, sintering, and chemical ceramic. In the fusion process, abrasive particles can be shaped by a chill roll, the face of which may or may not be engraved, a mold into which molten material is poured, or a heat sink material immersed in an aluminum oxide melt. See, for example, U.S. Pat. No. 3,377,660. In sintering processes, abrasive particles can be formed from refractory powders having a particle size of up to 10 micrometers in diameter. Binders can be added to the powders along with a lubricant and a suitable solvent to form a mixture that can be shaped into platelets or rods of various lengths and diameters. See, for example, U.S. Pat. No. 3,079,242. Chemical ceramic technology involves converting a colloidal dispersion or hydrosol (sometimes called a sol) to a gel or any other physical state that restrains the mobility of the components, drying, and firing to obtain a ceramic material. See, for example, U.S. Pat. Nos. 4,744,802 and 4,848,041.

Rudimentary molding processes have been disclosed as potentially useful in forming limited shaped abrasive particles, such as those disclosed in U.S. Pat. Nos. 5,201,916, 5,366,523, 5,584,896, and U.S. Pat. Publs. 2010/0151195, 2010/0151195. Other processes of forming shaped abrasive particles have been disclosed; see for example, U.S. Pat. Nos. 6,054,093, 6,228,134, 5,009,676, 5,090,968, and 5,409,645.

The industry continues to demand improved abrasive materials and abrasive articles.

SUMMARY

According to one aspect, a method includes applying a mixture into a shaping assembly within an application zone, and directing an ejection material at the mixture in the shaping assembly under a predetermined force, removing the mixture from the shaping assembly and forming a precursor shaped abrasive particle.

According to a second aspect, a method includes forming a precursor shaped abrasive particle in less than about 18 minutes, wherein forming includes applying a mixture into a shaping assembly within an application zone and removing the mixture from the shaping assembly to form a precursor shaped abrasive particle.

In yet another aspect, a method includes extruding a mixture having a viscosity of at least about $4\times10^{3}$ Pa s into an opening in a shaping assembly within an application zone and removing the mixture from the opening by applying an external force to the mixture to form a precursor shaped abrasive particle.

For another aspect, a system for forming shaped abrasive particles includes an application zone comprising a shaping assembly, a first portion having an opening and configured to be filled with a mixture, a second portion abutting the first portion, and an ejection zone comprising an ejection assembly configured to direct an ejection material toward the opening in the first portion of the shaping assembly.

According to another aspect, a system for forming precursor shaped abrasive particles can have a batch productivity of at least about 0.1 kg/min/m2 shaping surface.

In another aspect, a batch of shaped abrasive particles can include a first portion comprising a shaped abrasive particle having tortuous contour.

For another aspect, a shaped abrasive particle includes a body having a tortuous contour.

Still, in another aspect, a shaped abrasive particle has a body including an arrowhead shape.

BRIEF DESCRIPTION OF THE DRAWINGS

The present disclosure may be better understood, and its numerous features and advantages made apparent to those skilled in the art by referencing the accompanying drawings.

DETAILED DESCRIPTION

The systems and methods herein may be utilized in forming shaped abrasive particles. The shaped abrasive particles may be utilized in various applications, including for example coated abrasives, bonded abrasives, free abrasives, and a combination thereof. Various other uses may be derived for the shaped abrasive particles.

Figure 1:
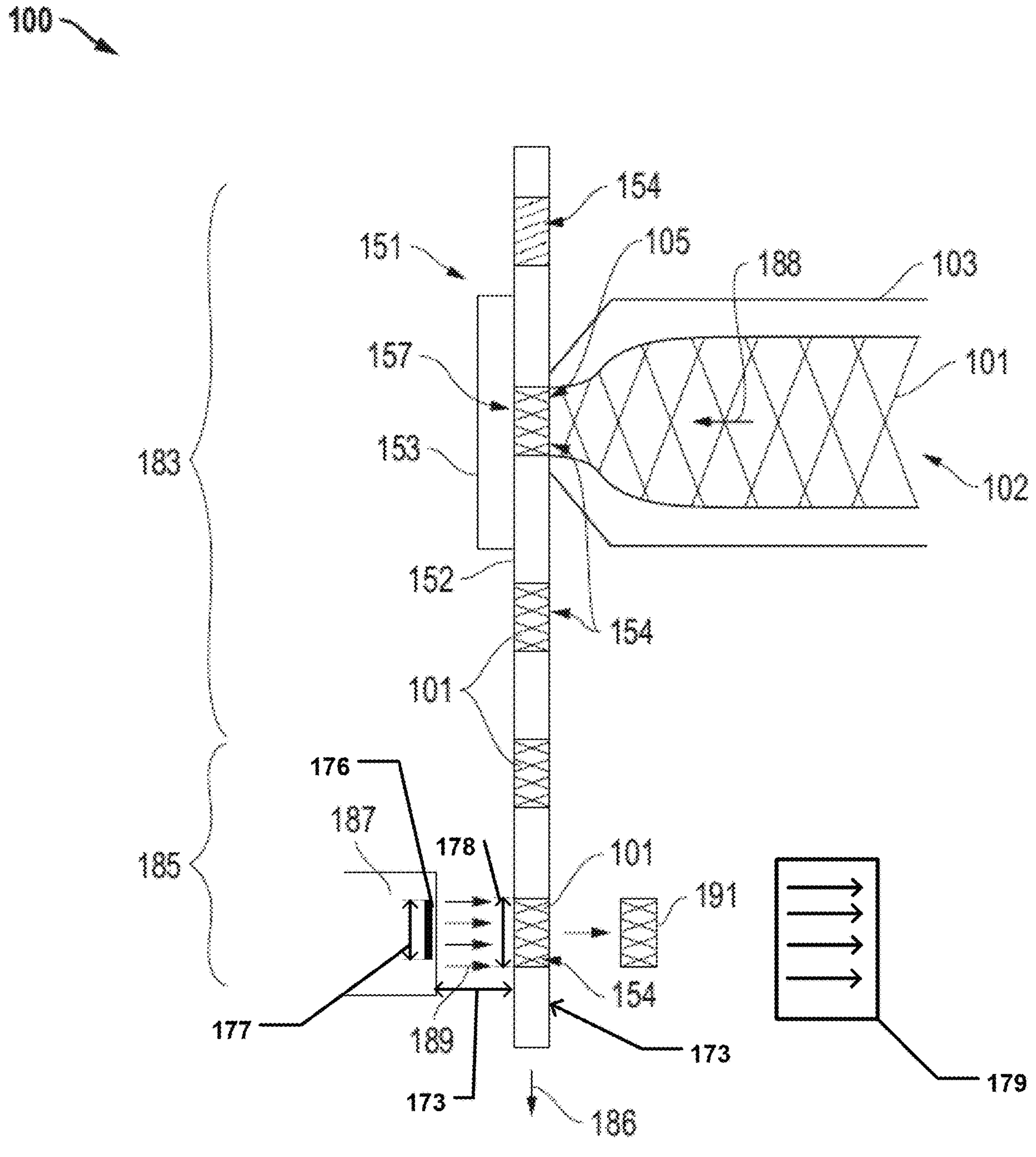
FIG. 1 includes a schematic of a system for forming a shaped abrasive particle in accordance with an embodiment.

FIG. 1 includes an illustration of a system for forming a shaped abrasive particle in accordance with an embodiment. As illustrated, the system 100 can further include a die 103 configured to facilitate delivery of a mixture 101 contained within a reservoir 102 of the die 103 to a shaping assembly 151. The process of forming a shaped abrasive particle can be initiated by forming a mixture 101 including a ceramic material and a liquid. In particular, the mixture 101 can be a gel formed of a ceramic powder material and a liquid, wherein the gel can be characterized as a shape-stable material having the ability to hold a given shape even in the green state (i.e., unfired or undried gel). In accordance with an embodiment, the gel can be formed of the ceramic powder material as an integrated network of discrete particles.

The mixture 101 can be formed to have a particular content of solid material, such as the ceramic powder material. For example, in one embodiment, the mixture 101 can have a high solids content, including for example, a solids content of at least about 25 wt %, such as at least about 35 wt %, at least about 42 wt %, at least about 44 wt %, at least about 46 wt %, at least about 48 wt %, at least about 50 wt %, or even at least about 51 wt % for the total weight of the mixture 101. Still, in at least one non-limiting embodiment, the solid content of the mixture 101 can be not greater than about 80 wt %, not greater than about 75 wt %, such as not greater than about 70 wt %, not greater than about 65 wt %, not greater than about 60 wt %, not greater than about 58 wt %, not greater than about 56 wt %, or even not greater than about 54 wt %. It will be appreciated that the content of the solids materials in the mixture 101 can be within a range between any of the minimum and maximum percentages noted above.

According to one embodiment, the ceramic powder material can include an oxide, a nitride, a carbide, a boride, an oxycarbide, an oxynitride, and a combination thereof. It will be appreciated, that in certain alternative embodiments, in place of a ceramic powder material, one may choose to use a precursor of a ceramic powder material. A precursor can be a material, which may or may not be in a powder form that is configured to change at least a portion of its composition or physical properties during processing to form a ceramic material. In particular instances, the ceramic material can include alumina. More specifically, the ceramic material may include a bochmite material, which may be a precursor of alpha alumina. The term "boehmite" is generally used to denote alumina hydrates including mineral boehmite, typically being Al2O3·H2O and having a water content on the order of 15%, as well as pseudobochmite, having a water content higher than 15%, such as 20-38% by weight. It is noted that bochmite (including pseudobochmite) has a particular and identifiable crystal structure, and accordingly unique X-ray diffraction pattern, and as such, is distinguished from other aluminous materials including other hydrated aluminas such as ATH (aluminum trihydroxide) a common precursor material used herein for the fabrication of bochmite particulate materials.

Furthermore, the mixture 101 can be formed to have a particular content of liquid material. Some suitable liquids may include inorganic materials, such as water or various organic media such as alcohols and the like. In accordance with one embodiment, the mixture 101 can be formed to have a liquid content less than the solids content of the mixture 101. In more particular instances, the mixture 101 can have a liquid content of at least about 20 wt %, such as at least about 25 wt % for the total weight of the mixture 101. In other instances, the amount of liquid within the mixture 101 can be greater, such as at least about 35 wt %, at least about 40 wt %, at least about 42 wt %, or even at least about 44 wt %. Still, in at least one non-limiting embodiment, the liquid content of the mixture can be not greater than about 80 wt %, such as not greater than about 65 wt %, not greater than about 60 wt %, not greater than about 55 wt %, not greater than about 52 wt %, not greater than about 49 wt %. It will be appreciated that the content of the liquid in the mixture 101 can be within a range between any of the minimum and maximum percentages noted above.

Furthermore, to facilitate processing and forming shaped abrasive particles according to embodiments herein, the mixture 101 can have a particular storage modulus. For example, the mixture 101 can have a storage modulus of at least about $1\times10^4$ Pa, such as at least about $4\times10^4$ Pa, such as at least about $4.4\times10^4$ Pa, at least about $5\times10^4$ Pa, at least about $6\times10^4$ Pa, at least about $8\times10^4$ Pa, at least about $10\times10^4$ Pa, at least about $15\times10^4$ Pa, at least about $20\times10^4$ Pa, at least about $30\times10^4$ Pa, or even at least about $40\times10^4$ Pa. In at least one non-limiting embodiment, the mixture 101 may have a storage modulus of not greater than about $80\times10^4$ Pa, not greater than about $70\times10^4$ Pa, not greater than about $65\times10^4$ Pa, or even not greater than about $60\times10^4$ Pa. It will be appreciated that the storage modulus of the mixture 101 can be within a range between any of the minimum and maximum values noted above. The storage modulus can be measured via a parallel plate system using ARES or AR-G2 rotational rheometers, with Peltier plate temperature control systems. For testing, the mixture 101 can be extruded within a gap between two plates that are set to be approximately 8 mm apart from each other. After extruding the gel into the gap, the distance between the two plates defining the gap is reduced to 2 mm until the mixture 101 completely fills the gap between the plates. After wiping away excess mixture, the gap is decreased by 0.1 mm and the test is initiated. The test is an oscillation strain sweep test conducted with instrument settings of a strain range between 0.01% to 100%, at 6.28 rad/s (1 Hz), using 25-mm parallel plate and recording 10 points per decade. Within 1 hour after the test completes, lower the gap again by 0.1 mm and repeat the test. The test can be repeated at least 6 times. The first test may differ from the second and third tests. Only the results from the second and third tests for each specimen should be reported.

Furthermore, to facilitate processing and forming shaped abrasive particles according to embodiments herein, the mixture 101 can have a particular viscosity. For example, the mixture 101 can have a viscosity of at least about $4\times10^3$ Pas, at least about $5\times10^3$ Pas, at least about $6\times10^3$ Pa s, at least about $8\times10^3$ Pas, at least about $10\times10^3$ Pas, at least about $20\times10^3$ Pas, at least about $30\times10^3$ Pas, at least about $40\times10^3$ Pas, at least about $50\times10^3$ Pas, at least about $60\times10^3$ Pas, at least about $65\times10^3$ Pas. In at least one non-limiting embodiment, the mixture 101 may have a viscosity of not greater than about $100\times10^3$ Pas, not greater than about $95\times10^3$ Pa s, not greater than about $90\times10^3$ Pas, or even not greater than about $85\times10^3$ Pas. It will be appreciated that the viscosity of the mixture 101 can be within a range between any of the minimum and maximum values noted above. The viscosity can be measured in the same manner as the storage modulus as described above.

In at least one embodiment, to facilitate processing and forming shaped abrasive particles according to embodiments herein, the mixture 101 can have a particular yield stress. For example, the mixture 101 can have a yield stress of at least about $1.5\times10^3$ Pa, at least about $4\times10^3$ Pa at least about $5\times10^3$ Pa, at least about $6\times10^3$ Pa, at least about $8\times10^3$ Pa, at least about $10\times10^3$ Pa, at least about $12\times10^3$ Pa s, at least about $20\times10^3$ Pas, at least about $30\times10^3$ Pa, at least about $40\times10^3$ Pa, or even at least about $65\times10^3$ Pa. In at least one non-limiting embodiment, the mixture 101 may have a yield stress of not greater than about $100\times10^3$ Pa, not greater than about $80\times10^3$ Pa, not greater than about $60\times10^3$ Pa, or even not greater than about $50\times10^3$ Pa. It will be appreciated that the yield stress of the mixture 101 can be within a range between any of the minimum and maximum values noted above. The yield stress can be measured in the same manner as the storage modulus as described above.

The rheological characteristics of the mixture 101 can be distinct from conventional mixtures and gels, such as those described in certain references. Moreover, the mixture 101 can be formed to have a particular relationship between one or more rheological characteristics (e.g., viscosity, yield stress, storage modulus, etc.) to facilitate forming. Notably, the gel may be significantly more "stiff", having a shear thinning characteristic, which may be entirely distinct from mixtures used in other forming methods.

Moreover, the mixture 101 can be formed to have a particular content of organic materials, including for example, organic additives that can be distinct from the liquid, to facilitate processing and formation of shaped abrasive particles according to the embodiments herein. Some suitable organic additives can include stabilizers, binders, such as fructose, sucrose, lactose, glucose, UV curable resins, and the like. It will be appreciated that the total content of all materials in the mixture (e.g., ceramic powder material, water, additives, etc.) add up to and do not exceed 100%.

Notably, the embodiments herein may utilize a mixture 101 that can be distinct from certain types of slurries. For example, the content of organic materials within the mixture 101, particularly, any of the organic additives noted above may be a minor amount as compared to other components within the mixture 101. In at least one embodiment, the mixture 101 can be formed to have not greater than about 30 wt % organic material for the total weight of the mixture 101. In other instances, the amount of organic materials may be less, such as not greater than about 15 wt %, not greater than about 10 wt %, or even not greater than about 5 wt %. Still, in at least one non-limiting embodiment, the amount of organic materials within the mixture 101 can be at least about 0.5 wt % for the total weight of the mixture 101. It will be appreciated that the amount of organic materials in the mixture 101 can be within a range between any of the minimum and maximum values noted above. In at least one alternative aspect, the mixture 101 may be essentially free of organic material.

Moreover, the mixture 101 can be formed to have a particular content of acid or base distinct from the liquid, to facilitate processing and formation of shaped abrasive particles according to the embodiments herein. Some suitable acids or bases can include nitric acid, sulfuric acid, citric acid, hydrochloric acid, tartaric acid, phosphoric acid, ammonium nitrate, and/or ammonium citrate. According to one particular embodiment, the mixture 101 can have a pH of less than about 5, and more particularly, within a range between at least about 2 and not greater than about 4, using a nitric acid additive. Alternatively, the rheology of the acidic gel can be further modified by converting the acidic gel to a basic gel through the use of bases such as ammonium hydroxide, sodium hydroxide, organics amines such as hexamehylenetetramine and the like Referencing FIG. 1, the mixture 101 can be provided within the interior of the die 103 and configured to be extruded through a die opening 105 positioned at one end of the die 103. As further illustrated, extruding can include applying a force 180 (or a pressure) on the mixture 101 to facilitate extruding the mixture 101 through the die opening 105. In accordance with an embodiment, a particular pressure may be utilized during extrusion. For example, the pressure can be at least about 10 kPa, such as at least about 500 kPa, at least about 1,000 kPa, at least about 2,000 kPa, or even at least about 3,000 kPa. Still, in at least one non-limiting embodiment, the pressure utilized during extrusion can be not greater than about 10,000 kPa, such as not greater than about 8,000 kPa, or even not greater than about 6,000 kPa. It will be appreciated that the pressure used to extrude the mixture 101 can be within a range between any of the minimum and maximum values noted above. Moreover, in certain instances, the die opening can have an area of approximately 3000 to 4000 square millimeters.

In accordance with one embodiment, the mixture 101 can have a coil value of at least about 1800 N. The coil value can be measured on an instrument called a Shimpo compression tester manufactured by Shimpo Instruments, Itasca Illinois, using a sample of mixture ranging from 30-60 grams in mass, which is manually pressed into a plastic/stainless steel cylinder of 2" in diameter. At the extrusion end of the cylinder, a plastic insert with a cylindrical hole establishes the compressed extrudate size of generally 2 mm in diameter. A plunger slides into the cylinder and when the test is started, the plunger will extrude the gel once the threshold coil force is reached. When the cylinder assembly is in position, the Shimpo compression tester moves a force probe down towards the plunger at a constant rate of 95-97 mm/min. When the threshold coil force is reached, the gel is extruded out of the insert hole and an output meter generates a peak force, which is the coli value. In another embodiment, the coil value can be at least about 1900 N, such as at least about 2000 N, at least about 2100 N, at least about 2200 N, or even at least about 2300 N. In one non-limiting embodiment, the coil value can be not greater than about 8000 N, such as not greater than about 6000 N, or even not greater than about 5000 N. Typically, coil values utilized for mixtures and gels used in conventional screen printing and molding processes, such as the processes described in U.S. Pat. Nos. 5,201,916 and 6,054,093 are less than about 1700 N, and more typically around 1000 N. Thus, certain mixtures according to the embodiments herein can be significantly more flow resistant compared to conventional mixtures.

As further illustrated in FIG. 1, the system 100 can include a shaping assembly 151. The shaping assembly can include a first portion 152 and a second portion 153. Notably, within the applications zone 183, the first portion 152 can be adjacent to the second portion 153. In more particular instances, within the application zone 183, the first portion 152 can be abutting a surface 157 of the second portion 153. The system 100 can be designed such that a portion of the shaping assembly 151, such as the first portion 152, may be translated between rollers. The first portion 152 may be operated in a loop such that the forming process can be conducted continuously.

As illustrated, the system 100 can include an application zone 183, including the die opening 105 of the die 103. The process can further include applying the mixture 101 into at least a portion of the shaping assembly 151. In particular instances, the process of applying the mixture 101 can include depositing the mixture 101 via a process, such as, extrusion, molding, casting, printing, spraying, and a combination thereof. In particular instances, such as that illustrated in FIG. 1, the mixture 101 may be extruded in a direction 188 through the die opening 105 and into at least a portion of the shaping assembly 151. Notably, a least a portion of the shaping assembly 151 can include at least one opening 154. In particular instances, such as that illustrated in FIG. 1, the shaping assembly 151 can include a first portion 152 having an opening 154 configured to receive the mixture 101 from the die 103.

In accordance with an embodiment, the shaping assembly 151 can include at least one opening 154 that can be defined by a surface or multiple surfaces, including for example, at least three surfaces. In particular instances, the opening 154 can extend through an entire thickness of the first portion 152 of the shaping assembly 151. Alternatively, the opening 154 can extend through an entire thickness of the shaping assembly 151. Still, in other alternative embodiments, the opening 154 can extend through a portion of the entire thickness of the shaping assembly 151.

Figure 2:
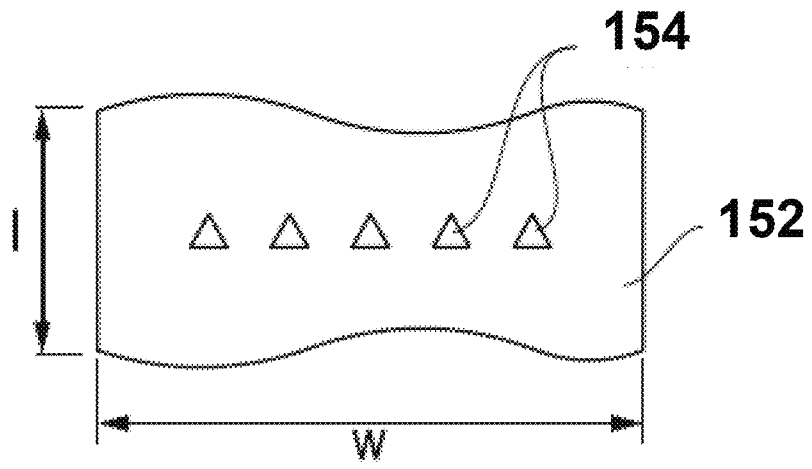
FIG. 2 includes an illustration of a portion of the system of FIG. 1 in accordance with an embodiment.

Referring briefly to FIG. 2, a segment of a first portion 152 is illustrated. As shown, the first portion 152 can include an opening 154, and more particularly, a plurality of openings 154. The openings 154 can extend into the volume of the first portion 152, and more particularly, extend through the entire thickness of the first portion 152 as perforations. As further illustrated, the first portion 152 of the shaping assembly 151 can include a plurality of openings 154 displaced from each other along a length of the first portion 152. In particular instances, the first portion 152 may be translated in a direction 186 through the application zone 183 at a particular angle relative to the direction of extrusion 188. In accordance with an embodiment, the angle between the directions of translation 186 of the first portion 152 and the direction of extrusion 188 can be substantially orthogonal (i.e., substantially 90°). However, in other embodiments, the angle may be different, such as acute, or alternatively, obtuse.

In particular instances, the shaping assembly 151 can include a first portion 152 that may be in the form of a screen, which may be in the form of a perforated sheet. Notably, the screen configuration of the first portion 152 may be defined by a length of material having a plurality of openings 154 extending along its length and configured to accept the mixture 101 as it is deposited from the die 103. The first portion can be in the form of a continuous belt that is moved over rollers for continuous processing. In certain instances, the belt can be formed to have a length suitable for continuous processing, including for example, at length of at least about 0.1 m, such as at least about 0.5 m. Still, in another embodiment, the length of the belt may not need to be particularly long to facilitate efficient and productive processing. For example, in one non-limiting embodiment, the belt may be less than about 10 m, not greater than about 8 m, not greater than about 5 m, not greater than about 3 m, not greater than about 2 m, or even not greater than about 1 m.

In a particular instance, the openings 154 can have a two-dimensional shape as viewed in a plane defined by the length (l) and width (w) of the screen. While the openings 154 are illustrated as having a triangular two-dimensional shape, other shapes are contemplated. For example, the openings 154 can have a two-dimensional shape such as polygons, ellipsoids, numerals, Greek alphabet letters, Latin alphabet letters, Russian alphabet characters, Arabic alphabet characters (or alphabet letters of any language), complex shapes including a combination of polygonal shapes, and a combination thereof. In particular instances, the openings 154 may have two-dimensional polygonal shapes such as, a triangle, a rectangle, a quadrilateral, a pentagon, a hexagon, a heptagon, an octagon, a nonagon, a decagon, and a combination thereof. Moreover, a first portion 152 can be formed to include a combination of openings 154 having a plurality of different two-dimensional shapes. It will be appreciated that the first portion 152 may be formed to have a plurality of openings 154 that may have different two-dimensional shapes as compared to each other.

In other embodiments, the shaping assembly 151 may be in the form of a mold. In particular, the shaping assembly 151 can be in the shape of a mold having openings 154 defining side surfaces and a bottom surface configured to accept the mixture 101 from the die 103. Notably, a mold configuration may be distinct from a screen configuration such that the mold has openings that do not extend through the entire thickness of the shaping assembly 151.

In one design, the shaping assembly 151 can include a second portion 153 configured to be adjacent to the first portion 152 within the application zone 183. In particular instances, the mixture 101 can be applied into the opening 154 of the first portion 152 and configured to abut a surface 157 of the second portion 153 within the application zone 183. For one particular design, the second portion 153 can be configured as a stop surface allowing the mixture 101 to fill the opening 154 within the first portion 152.

According to one embodiment, the surface 154 of the second portion 153 can be configured to contact the mixture 101 while it is contained within the opening 154 of the first portion 152. The surface 157 may have a particular coating to facilitate processing. For example, the surface 157 may include a coating including an inorganic material, an organic material, and a combination thereof. Some suitable inorganic materials can include a ceramic, a glass, a metal, a metal alloy, and a combination thereof. Certain suitable examples of an inorganic material can include a polymer, including for example, a fluoropolymer, such as polytetrafluoroethylene (PTFE).

Alternatively, the surface 157 may include features, including for example protrusions and grooves such that during processing the mixture 101 contained within the opening 154 of the first portion 152 may replicate features contained on the surface 157 of the second portion 153.

In an alternative embodiment, the second portion 153, and more particularly the surface 157 of the second portion 153 may include a specific composition that may be imparted to the mixture 101 contained in the opening 154 of the first portion 152. For example, the surface 157 may be coated with an additive. The additive may be an inorganic material, organic material, and a combination thereof. In certain instances, the additive may be a dopant. In such embodiments, the surface of the mixture 101 in contact with the surface 157 of the second portion 153 may be doped while it is contained in the shaping assembly 151, and more particularly, within the opening 154 of the first portion 152.

As described herein, in particular instances, the first portion 152 may be translated in a direction 186. As such, within the application on 183, the mixture 101 contained in the openings 154 of the first portion 152 may be translated over the surface 157 of the second portion 153. In accordance with an embodiment, the first portion 152 may be translated in a direction 186 at a particular rate to facilitate suitable processing. For example, the first portion 152 may be translated through the application zone 183 at a rate of at least about 0.5 mm/s. In other embodiments, the rate of translation of the first portion 152 may be greater, such as at least about 1 cm/s, at least about 3 cm/s, at least about 4 cm/s, at least about 6 cm/s, at least about 8 cm/s, or even at least about 10 cm/s. Still, in at least one non-limiting embodiment, the first portion 152 may be translated in a direction 186 at a rate of not greater than about 5 m/s, such as not greater than about 1 m/s, or even not greater than about 0.5 m/s. It will be appreciated that the first portion 152 may be translated at a rate within a range between any of the minimum and maximum values noted above.

After applying the mixture 101 in the openings 154 of the first portion 152 of the shaping assembly 151, the first portion 152 may be translated to an ejection zone 185. Translation may be facilitated by a translator configured to translate at least a portion of the shaping assembly from the application zone 183 to the ejection zone 185. Some suitable examples of a translator may include a series of rollers, about which the first portion 152 may be looped and rotated around.

The ejection zone may include at least one ejection assembly 187 that can be configured to direct an ejection material 189 at the mixture 101 contained within the openings 154 of the first portion 152. In a particular embodiment, during the translation of the first portion 152 from the application zone 183 to the ejection zone 185, only a portion of the shaping assembly 151 may be moved. For example, the first portion 152 of the shaping assembly 151 may be translated in a direction 186, while at least the second portion 153 of the shaping assembly 151 may be stationary relative to the first portion 152. That is, in particular instances the second portion 153 may be contained entirely within the application zone 183 and may be removed from contact with the first portion 152 within the ejection zone 185. In particular instances, the second portion 153, which in certain embodiments may be alternatively referred to as the backing plate, terminates prior to the ejection zone 185.

The first portion 152 can be translated from the application zone 183 into the ejection zone 185, wherein opposing major surfaces of the mixture 101 contained within the openings 154 of the first portion 152 may be exposed. In certain instances, exposure of both major surfaces of the mixture 101 in the openings 154 can facilitate further processing, including for example, ejection of the mixture 101 from the openings 154.

As further illustrated in the assembly 100, in particular embodiments, the first portion 152 of the shaping assembly 151 can be in direct contact with the second portion 153 of the shaping assembly 151 within the application zone 183. Moreover, prior to translating the first portion 152 from the application zone 183 to the ejection zone 185, the first portion 152 can be separated from the second portion 153. As such, the mixture 101 contained within the openings 154 can be removed from at least one surface of a portion of the shaping assembly 151, and more particularly, the surface 157 of the second portion 153 of the shaping assembly 151. Notably, the mixture 101 contained within the opening 154 can be removed from the surface 157 of the second portion 153 prior to ejection of the mixture 101 from the openings 154 in the ejection zone 185. The process of removing the mixture 101 from the first portion 152 of the shaping assembly 151 can be conducted after removing the second portion 153 from contact with the first portion 152.

In one embodiment, the ejection material 189 can be directed at the first portion 152 of the shaping assembly 151 to facilitate contact with the mixture 101 in the openings 154 of the first portion 152. In particular instances, the ejection material 189 can directly contact an exposed major surface of the mixture 101 and an opening 154 of the first portion 152 of the shaping assembly 151. As will be appreciated, at least a portion of the ejection material 189 may also contact a major surface of the second portion 152 as it is translated by the ejection assembly 187.

In accordance with an embodiment, the ejection material 189 can be a fluidized material. Suitable examples of fluidized materials can include a liquid, a gas, and a combination thereof. In one embodiment, the fluidized material of the ejection material 189 can include an inert material. Alternatively, the fluidized material can be a reducing material. Still, in another particular embodiment, the fluidized material may be an oxidizing material. According to one particular embodiment, the fluidized material can include air.

In an alternative embodiment, the ejection material 189 may include an aerosol comprising a gas phase component, a liquid phase component, a solid phase component, and a combination thereof. In yet another embodiment, the ejection material 189 can include an additive. Some suitable examples of additives can include materials such as an organic material, an inorganic material, a gas phase component, a liquid phase component, a solid phase component, and a combination thereof. In one particular instance, the additive can be a dopant material configured to dope the material of the mixture 101. In accordance with another embodiment, the dopant can be a liquid phase component, a gas phase component, a solid phase component, or a combination thereof that can be contained within the ejection material. Still, in one particular instance, the dopant can be present as a fine powder suspended in the ejection material.

Directing the ejection material at the mixture 101 in the opening 154 of the first portion 152 of the shaping assembly 151 can be conducted at a predetermined force. The predetermined force may be suitable to eject the mixture from the opening 154 to form a precursor shaped abrasive particle, and may be a function of the rheological parameters of the mixture 101, the geometry of the cavity, the materials of construction of shaping assembly, surface tension forces between the mixture 101 and the materials of the shaping assembly 151, and a combination thereof. In one embodiment, the predetermined force can be at least about 0.1 N, such as at least about 1 N, at least about 10 N, at least about 12 N, at least about 14 N, at least about 16 N, at least about 50 N, or even at least about 80 N. Still, in one non-limiting embodiment, the predetermined force may be not greater than about 500 N, such as not greater than about 200 N, not greater than about 100 N, or even not greater than about 50 N. The predetermined force may be within a range between any of the minimum and maximum values noted above.

Notably, the use of the ejection material 189 may be essentially responsible for the removal of the mixture 101 from the opening 154. More generally, the process of removing the mixture 101 from an opening 154 can be conducted by applying an external force to the mixture 101. Notably, the process of applying external force includes limited strain of the shaping assembly and an application of an outside force to eject the mixture 101 from the opening 154. The process of ejection causes removal of the mixture 101 from the opening 154 and may be conducted with relatively little or essentially no shearing of the first portion 152 relative to another component (e.g., the second portion 153). Moreover, ejection of the mixture may be accomplished with essentially no drying of the mixture 101 within the opening 154. As will be appreciated, the precursor shaped abrasive particle 191 may be ejected from the opening 154 and collected. Some suitable methods of collecting can include a bin underlying the first portion 152 of the shaping assembly 151. Alternatively, the mixture 101 can be ejected from the opening 154 in such a manner that the precursor shaped abrasive particle 191 falls back onto the first portion 152 after ejection. The precursor shaped abrasive particle 191 can be translated out of the ejection zone on the first portion 152 to other zones for further processing.

In accordance with an embodiment, the mixture 101 can experience a change in weight of less than about 5% for the total weight of the mixture 101 for the duration the mixture 101 is in the opening of the first portion 152 of the shaping assembly 151. In other embodiments, the weight loss of the mixture 101 while it is contained within the shaping assembly 151 can be less, such as less than about 4%, less than about 3%, less than about 2%, less than about 1%, or even less than about 0.5%. Still, in one particular embodiment, the mixture 101 may have essentially no change in weight for the duration the mixture 101 is in the opening 154 of the shaping assembly 151.

Furthermore, during processing, the mixture 101 may experience a limited change in volume (e.g., shrinkage) for the duration the mixture 101 is in an opening 154 of the shaping assembly 151. For example, the change of volume of the mixture 101 can be less than about 5% for the total volume of the mixture 101 for the duration between applying the mixture 101 in the opening and ejection of the mixture from the opening 154. In other embodiments, the total change in volume may be less, such as less than about 4%, less than about 3%, less than about 2%, less than about 1%, or even less than about 0.5%. In one particular embodiment, the mixture may experience essentially no change in volume for the entire duration the mixture 101 is in an opening 154 of the shaping assembly 151.

In accordance with an embodiment, the mixture 101 may undergo a controlled heating process, while the mixture is contained within the shaping assembly 151. For example, the heating process may include heating the mixture at a temperature greater than room temperature for a limited time. The temperature may be at least about 30° C., such as at least about 35° C., at least about 40° C., such as at least about 50° C., at least about 60° C., or even at least about 100° C. Still, the temperature may be not greater than about 300° C., such as not greater than about 200° C., or even not greater than about at least about 150° C., or even not greater than about 100° C. The duration of heating can be particularly short, such as not greater than about 10 minutes, not greater than about 5 minutes, not greater than about 3 minutes, not greater than about 2 minutes, or even not greater than about 1 minute.

The heating process may utilize a radiant heat source, such as infrared lamps to facilitate controlled heating of the mixture 101. Moreover, the heating process may be adapted to control the characteristics of the mixture and facilitate particular aspects of the shaped abrasive particles according to embodiments herein.

Yet, in another aspect, the mixture 101 may undergo a limited change in temperature within the shaping assembly 151, and particularly, the system may utilize a limited temperature differential between the application zone 183 and the ejection zone 185. For example, the mixture 101 can experience a change in temperature of not greater than about 10° C. in a duration between applying the mixture 101 into the shaping assembly 151 and removing the mixture 101 from the shaping assembly 151. In other embodiments, the difference can be less, such as not greater than about 8° C., not greater than about 6° C., not greater than about 4° C., or even essentially no change in temperature in the duration the mixture 101 is contained within the shaping assembly 151.

In certain instances, the method may utilize a particular distance between the application zone 183 and the ejection zone 185, and more particularly, between the point of filling the shaping assembly 151 with the mixture 101 and the ejection assembly 187, including for example, at least about 0.2 m. Still, in other designs, the distance between the application zone 183 and ejection zone 185 may be not greater than about 10 m, such as not greater than about 1 m. This may facilitate a smaller footprint of the system and improved productivity.

The method of forming a precursor shaped abrasive particle may be conducted in a rapid fashion facilitating efficient processing. For example, the mixture may have an average residence time in an opening 154 of the shaping assembly 151 that is less than about 18 minutes. In other embodiments, the average residence time can be less than about 14 minutes, less than about 12 minutes, less than about 10 minutes, less than about 8 minutes, less than about 7 minutes, less than about 6 minutes, less than about 5 minutes, less than about 2 minutes, less than about 1 minute, less than about 50 seconds, less than about 40 seconds, less than about 30 seconds, less than about 20 seconds, or even less than about 15 seconds. Still, in at least one non-limiting embodiment, the average residence time can be at least about 1 second. It will be appreciated that the average residence time can be within a range between any of the minimum and maximum times noted above.

In accordance with an embodiment, the process of ejecting the mixture 101 from an opening 154 of the shaping assembly 151 can be conducted at a particular temperature. For example, the process of ejection can be conducted at a temperature of not greater than about 300° C. In other embodiments, the temperature during ejection can be not greater than about 250° C., not greater than about 200° C., not greater than about 180° C., not greater than about 160° C., not greater than about 140° C., not greater than about 120° C., not greater than about 100° C., not greater than about 90° C., not greater than about 60° C., or even not greater than about 30° C. Alternatively, in a non-limiting embodiment, the process of directing an ejection material at the mixture and ejecting the mixture 101 from an opening 151 may be conducted at certain temperatures, including those temperatures that may be above room temperature. Some suitable temperatures for conducting the ejection process can be at least about −80° C., such as at least about −50° C., at least about −25° C., at least about 0° C., at least about 5° C., at least about 10° C., or even at least about 15° C. It will be appreciated that in certain non-limiting embodiments, the process of ejecting the mixture 101 from an opening 154 may be conducted at a temperature within a range between any of the temperatures noted above.

Furthermore, it will be appreciated that the ejection material 189 may be prepared and ejected from the ejection assembly 187 at a predetermined temperature. For example, the ejection material 189 may be at a temperature significantly less than the surrounding environment, such that upon contact with the mixture 101 within the opening 154, the mixture is configured to be reduced in temperature. During the ejection process, the mixture 101 may be contacted by the ejection material 187 that can be cooler in temperature than the temperature of the mixture 101 causing contraction of the material of the mixture 101 and ejection from the opening 154.

In accordance with an embodiment, the ejection assembly 187 can have a particular relationship with respect to the openings 154 of the shaping assembly 151 to facilitate suitable formation of precursor shaped abrasive particles according to an embodiment. For example, in certain instances, the ejection assembly 187 can have an ejection material opening 176 from which the ejection material 189 exits the ejection assembly 187. The ejection material opening 176 can define an ejection material opening width 177. Furthermore, the openings 154 of the first portion 152 can have a shaping assembly opening width 178 as illustrated in FIG. 1, which may define a largest dimension of the opening in the same direction as the ejection material opening width 177. In particular instances, the ejection material opening width 177 can be substantially the same as the shaping assembly opening width 178. In still another embodiment, the ejection material opening width 177 can be different than the shaping assembly opening width 178, such as for example, the ejection material opening width 177 can be significantly less than the shaping assembly opening width 178. According to one particular embodiment, the ejection material opening width 177 can be not greater than about 50% of the shaping opening width 178. In yet another embodiment, the ejection material opening width 177 can be not greater than about 40%, such as not greater than about 30%, not greater than about 20%, not greater than about 10%, not greater than about 8%, not greater than about 6%, not greater than about 5%, not greater than about 4%, not greater than about 3%, or even not greater than about 2% of the shaping opening width 178. Still, in at least one non-limiting embodiment, the ejection material opening width 177 can be at least about 0.01%, such as at least about 178.

Moreover, the gap distance 173 between the surface of the ejection assembly 187 and the first portion 152 of the shaping assembly can be controlled to facilitate formation of shaped abrasive particles according to an embodiment. The gap distance 173 may be modified to facilitate forming shaped abrasive particles with certain features or limiting the formation of certain features.

It will further be appreciated that a pressure differential may be created on opposite sides of the first portion 152 of the shaping assembly 151 within the ejection zone 185. In particular, in addition to use of the ejection assembly 187, the system 100 may utilize an optional system 179 (e.g., a reduced pressure system) configured to reduce the pressure on the opposite side of the first portion 152 from the ejection assembly 187 to facilitate pulling the precursor shaped abrasive particle 191 from the opening 154. The process may include providing a negative pressure difference on the side of the shaping assembly opposite the ejection assembly 187. It will be appreciated that balancing the predetermined force of the ejection material and the negative pressure applied to the back side 172 of the first portion 152 of the shaping assembly within the ejection zone 185 can facilitate formation of different shape features in the precursor shaped abrasive particles 191 and the final-formed shaped abrasive particles.

After ejecting the mixture 101 from the opening 154 of the first portion 152, a precursor shaped abrasive particle is formed. According to a particular embodiment, the precursor shaped abrasive particle can have a shape substantially replicating the shape of the openings 154.

The system and methods of the embodiments herein may have a particular efficiency and productivity associated with forming precursor shaped abrasive particles. In one particular instance, the method can include forming a batch of precursor shaped abrasive particles having a weight of not less than about 1 kg in not greater than about 30 minutes. In yet another embodiment, the system and the method of forming can be configured to have a batch efficiency of at least about 0.05 kg/min, such as at least about 0.07 kg/min, at least about 0.08 kg/min, at least about 0.09 kg/min, at least about 0.1 kg/min, at least about 0.13 kg/min, at least about 0.15 kg/min, such as at least about 0.17 kg/min, at least about 0.2 kg/min, at least about 0.3 kg/min, at least about 0.4 kg/min, at least about 0.5 kg/min, at least about 0.6 kg/min, or even at least about 0.8 kg/min.

The system and method of the embodiments herein may have a particular productivity associated with forming precursor shaped abrasive particles. In one particular instance, the system can be configured to have a batch productivity of at least about 0.1 kg/min/$m^2$ of shaping surface, wherein the area of the shaping surface is the total surface area of a single side of the first portion (including openings), which may be in the form of a belt. In another embodiment, the system can have a batch productivity of at least about 0.15 kg/min/$m^2$, at least about 0.2 kg/min/$m^2$, at least about 0.25 kg/min/$m^2$, at least about 0.3 kg/min/$m^2$, at least about 0.35 kg/min/$m^2$, at least about 0.4 kg/min/$m^2$, such as at least about 0.45 kg/min/$m^2$, at least about 0.5 kg/min/$m^2$, at least about 0.55 kg/min/$m^2$, at least about 0.6 kg/min/$m^2$, at least about 0.7 kg/min/$m^2$, at least about 0.8 kg/min/$m^2$, or even at least about 1 kg/min/$m^2$.

In certain instances, the precursor shaped abrasive particle can be gathered and undergo further processing. For example, further processing can include shaping, applying a dopant material, drying, sintering, and the like. In fact, the precursor shaped abrasive particle may be translated through a shaping zone, wherein at least one exterior surface of the particles may be shaped. Shaping can include altering a contour of the precursor shaped abrasive particle through one or more processes, such as, embossing, rolling, cutting, engraving, patterning, stretching, twisting, and a combination thereof. In one particular embodiment, the process of shaping can include contacting a shaping structure, having a particular texture to an exterior surface of the precursor shaped abrasive particle to impart the texture to the exterior surface of the particle. It will be appreciated that the shaping structure can take various forms, including for example, a roller having various features on its surface.

In certain other instances, after ejection, the precursor shaped abrasive particle may have a dopant material applied to at least one exterior surface of the precursor particle. A dopant material may be applied utilizing various methods including for example, spraying, dipping, depositing, impregnating, transferring, punching, cutting, pressing, crushing, and any combination thereof. In particular instances, the application zone may utilize a spray nozzle, or a combination of spray nozzles to spray dopant material onto the precursor shaped abrasive particle. It will be appreciated that the process of applying a dopant material during further processing can be performed at various processing stages, including for example, before drying or after drying, or before calcining or after calcining, before sintering or after sintering.

In accordance with an embodiment, applying a dopant material can include the application of a particular material, such as a salt, which can be a precursor salt material that includes a dopant material to be incorporated into the finally-formed shaped abrasive particles. For example, a metal salt can include an element or compound that is the dopant material. It will be appreciated that the salt material may be in liquid form, such as in a dispersion comprising the salt and liquid carrier. The salt may include nitrogen, and more particularly, can include a nitrate. In one embodiment, the salt can include a metal nitrate, and more particularly, consist essentially of a metal nitrate.

In one embodiment, the dopant material can include an element or compound such as an alkali element, alkaline earth element, rare earth element, hafnium, zirconium, niobium, tantalum, molybdenum, vanadium, or a combination thereof. In one particular embodiment, the dopant material includes an element or compound including an element such as lithium, sodium, potassium, magnesium, calcium, strontium, barium, scandium, yttrium, lanthanum, cesium, prascodymium, niobium, hafnium, zirconium, tantalum, molybdenum, vanadium, chromium, cobalt, iron, germanium, manganese, nickel, titanium, zinc, silicon, boron, carbon and a combination thereof.

And further, the precursor shaped abrasive particle may undergo further processing, including for example, heating, curing, vibration, impregnation, and a combination thereof. In one embodiment, the precursor shaped abrasive particle may be dried. Drying may include removal of a particular content of material, including volatiles, such as water. In accordance with an embodiment, the drying process can be conducted at a drying temperature of not greater than about 300° C., such as not greater than about 280° C., or even not greater than about 250° C. Still, in one non-limiting embodiment, the drying process may be conducted at a drying temperature of at least about 10° C. It will be appreciated that the drying temperature may be within a range between any of the minimum and maximum temperatures noted above.

In accordance with an embodiment, the process of forming the shaped abrasive particle may include additional processes, including calcination, impregnation, sintering and a combination thereof. Calcination may occur to remove volatiles and cause a phase change in the material, including for example, a high-temperature phase material (e.g., alpha alumina). In one instance, a shaped abrasive particle can comprise at least about 80 wt % alpha alumina for the total weight of the particle. In other instances, the content of alpha alumina may be greater, such that the shaped abrasive particle may consist essentially of alpha alumina. Impregnation may occur to incorporate other materials into the material of the mixture 101, including for example, a dopant. Sintering of the precursor shaped abrasive particle may be utilized to densify the particle. In a particular instance, the sintering process can facilitate the formation of a high-temperature phase ceramic material. For example, in one embodiment, the precursor shaped abrasive particle may be sintered such that a high-temperature phase of alumina, such as alpha alumina is formed.

Additional processes, such as cleaning, may be completed on any portions of the shaping assembly 151, to facilitate regular and repetitive processing. For example, cleaning may be conducted on the first portion 152 after ejecting the mixture, and more particularly cleaning the openings 154 of the first portion 152 after translating the first portion 152 through the ejection zone 185. Additionally, the portions of the shaping assembly 151, may undergo a drying process.

After the precursor shaped abrasive particle is sintered, a finally-formed shaped abrasive particle results, which may be incorporated into an abrasive tool, including for example, a coated abrasive, a bonded abrasive, and the like. According to one embodiment, the shaped abrasive particle can have a particular size, as measured by the length of the body. For example, the shaped abrasive particle may have a median particle size of not greater than about 5 mm. Alternatively, the median particle may be less, such as not greater than about 4 mm, not greater than about 3 mm, not greater than about 2 mm, or even not greater than about 1.5 mm. In still another aspect, the median particle size of the shaped abrasive particle can be at least about 10 microns, at least about 100 microns, at least about 200 microns, at least about 400 microns, at least about 600 microns, or even at least about 800 microns. It will be appreciated that the median particle size of the shaped abrasive particle can be within a range between any of the above minimum and maximum values.

The shaped abrasive particle of one embodiment can have a particular grain size, particularly for grains of alpha alumina. For example, the shaped abrasive particle may have an average grain size of not greater than about 500 microns, such as not greater than about 250 microns, or even not greater than about 100 microns, not greater than about 50 microns, not greater than about 20 microns, or even not greater than about 1 micron. In another aspect, the average grain size can be at least about 0.01 microns, such as at least about 0.05 microns, at least about 0.08 microns, or even at least about 0.1 microns. It will be appreciated that the average grain size of the shaped abrasive particle can be within a range between any of the above minimum and maximum values.

In yet another embodiment, the shaped abrasive particle can include a dopant material, which can include an element or compound such as an alkali element, alkaline earth element, rare earth element, hafnium, zirconium, niobium, tantalum, molybdenum, vanadium, or a combination thereof. In one particular embodiment, the dopant material includes an element or compound including an element such as lithium, sodium, potassium, magnesium, calcium, strontium, barium, scandium, yttrium, lanthanum, cesium, praseodymium, niobium, hafnium, zirconium, tantalum, molybdenum, vanadium, silicon, boron, carbon or a combination thereof.

In certain instances, the shaped abrasive particle can be formed to have a specific content of dopant material. For example, the body of a shaped abrasive particle may include not greater than about 20 wt % dopant material for the total weight of the body. In other instances, the amount of dopant material can be less, such as not greater than about 16 wt %, not greater than about 14 wt %, not greater than about 12 wt %, not greater than about 11 wt %, not greater than about 10 wt %, not greater than about 9 wt %, not greater than about 8 wt %, not greater than about 7 wt %, not greater than about 6 wt %, or even not greater than about 5 wt % for the total weight of the body. In at least one non-limiting embodiment, the amount of dopant material can be at least about 0.5 wt %, such at least about 1 wt %, at least about 1.3 wt %, at least about 1.8 wt %, at least about 2 wt %, at least about 2.3 wt %, at least about 2.8 wt %, or even at least about 3 wt % for the total weight of the body. It will be appreciated that the amount of dopant material within the body of the shaped abrasive particle can be within a range between any of the minimum or maximum percentages noted above.

A shaped abrasive particle according to one embodiment can have a body defined by a length (l), which can be the longest dimension of any side of the shaped abrasive particle, a width (w) defined as a longest dimension of the shaped abrasive particle through a midpoint of the shaped abrasive particle, and a thickness (t) defined as the shortest dimension of the shaped abrasive particle extending in a direction perpendicular to the length and width. In specific instances, the length can be greater than or equal to the width. Moreover, the width can be greater than or equal to the thickness.

Additionally, the body of the shaped abrasive particle can have particular two-dimensional shapes. For example, the body can have a two-dimensional shape as viewed in a plane define by the length and width having a polygonal shape, ellipsoidal shape, a numeral, a Greek alphabet character, Latin alphabet character, Russian alphabet character, or any alphabet character, complex shapes utilizing a combination of polygonal shapes and a combination thereof. Particular polygonal shapes include triangular, rectangular, quadrilateral, pentagon, hexagon, heptagon, octagon, nonagon, decagon, any combination thereof.

Figure 3A:
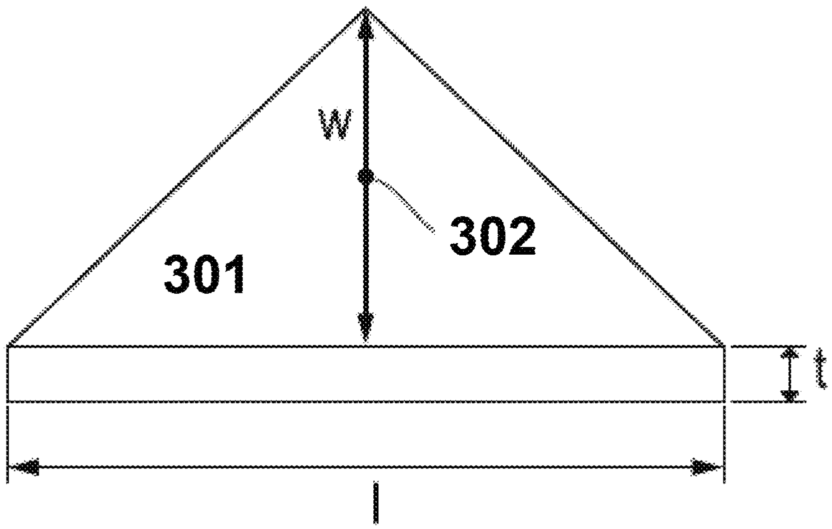
FIGS. 3A-3C include perspective view illustrations of shaped abrasive particles in accordance with an embodiment.
Figure 3B:
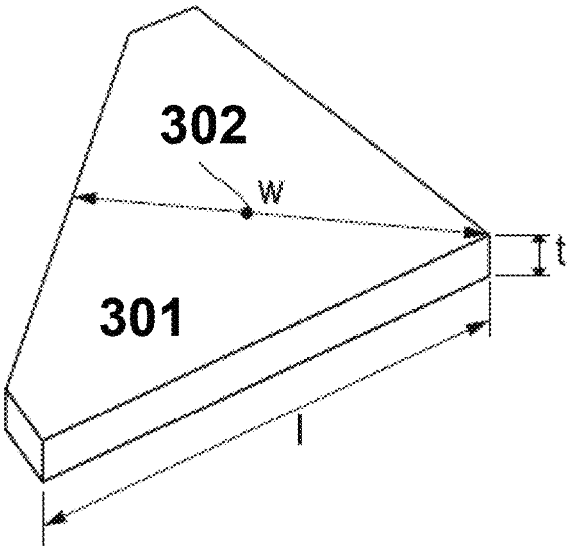
Figure 3C:
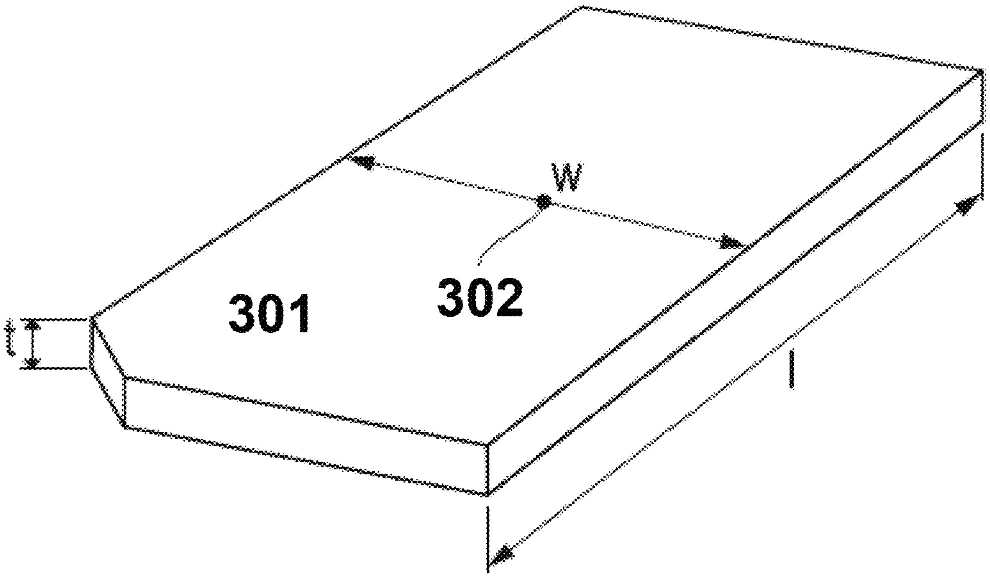

FIGS. 3A-3C include perspective view illustrations of shaped abrasive particles that can be formed through the processes of the embodiments herein. FIG. 3A includes a perspective view illustration of a shaped abrasive particle in accordance with an embodiment. In particular, the body 301 of the shaped abrasive particle can have a length (l), a width (w) extending through a midpoint 302 of the body 301, and a thickness (t). In accordance with an embodiment, the body 301 can have a primary aspect ratio defined as a ratio of length:width. In certain instances, the primary aspect ratio of the body 301 can be at least about 1.2:1, such as at least about 1.5:1, at least about 2:1, at least about 3:1, or even at least about 4:1. Still, the primary aspect ratio may be not greater than about 100:1. It will be appreciated that the primary aspect ratio of the body 301 may be within a range between any of the minimum and maximum ratios noted above.

Furthermore, the body 301 can have a secondary aspect ratio defined by a ratio of length:thickness. In certain instances, the secondary aspect ratio of the body 301 may be at least about 1.2:1, such as at least about 1.5:1, at least about 2:1, at least about 3:1, at least about 4:1, at least about 5:1, or even at least about 10:1. Still, in at least one non-limiting embodiment, the body 301 can have a secondary aspect ratio that is not greater than about 100:1. It will be appreciated that the secondary aspect ratio may be within a range between any of the minimum and maximum ratios provided above.

Furthermore, the shaped abrasive particle of an embodiment can have a tertiary aspect ratio defined by a ratio of the width:thickness. In certain instances, the tertiary aspect ratio of the body 301 may be at least about 1.2:1, such as at least about 1.5:1, at least about 2:1, at least about 3:1, at least about 4:1, at least about 5:1, or even at least about 10:1. Still, in at least one non-limiting embodiment, the body 301 can have a tertiary aspect ratio that is not greater than about 100:1. It will be appreciated that the tertiary aspect ratio may be within a range between any of the minimum and maximum ratios provided above.

FIG. 3B includes a perspective view illustration of a shaped abrasive particle in accordance with an embodiment. As illustrated, the shaped abrasive particle can have a corner-truncated triangular shape, wherein two edges and a side surface extending between the edges replace a position that would normally be occupied by a single corner in a typical triangular-shaped body. In particular, the body 301 of the shaped abrasive particle can have a length (l), a width (w) extending through a midpoint 302 of the body 301, and a thickness (t).

FIG. 3C includes a perspective view illustration of a shaped abrasive particle formed in accordance with an embodiment. Notably, the body 301 can have a generally quadrilateral shape. However, in one particular embodiment, the body 301 may be a corner truncated quadrilateral, and more particularly a corner truncated parallelogram or trapezoidal shape, wherein two edges and a side surface extending between the edges replace a position that would normally be occupied by a single corner in a typical quadrilateral-shaped body. In particular, the body 301 of the shaped abrasive particle can have a length (l), a width (w) extending through a midpoint 302 of the body 301, and a thickness (t). The body 301 can have the any of the features of any shaped abrasive particle described in the embodiments herein.

Figure 4:
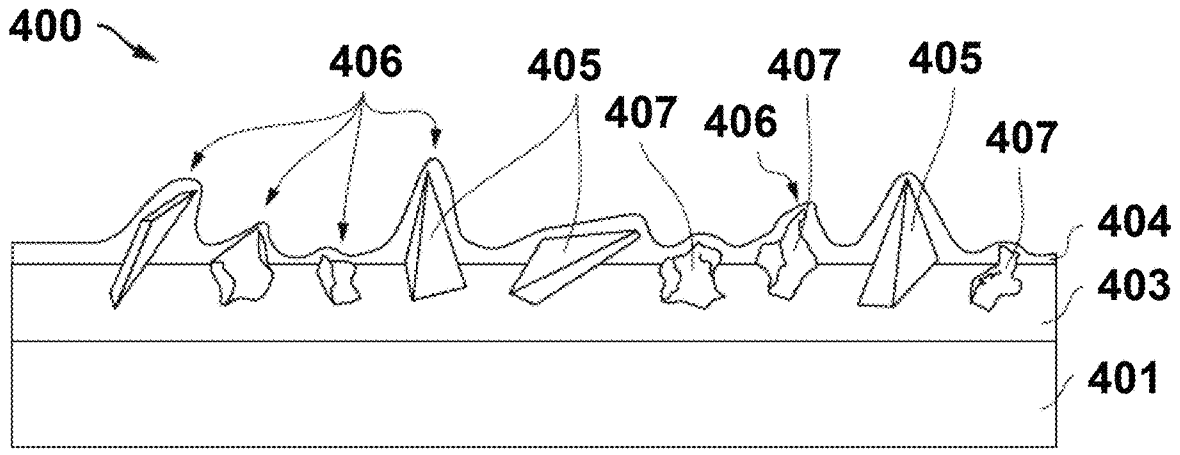
FIG. 4 includes a coated abrasive including shaped abrasive particles according to an embodiment.

FIG. 4 includes a cross-sectional illustration of a coated abrasive article incorporating the abrasive particulate material in accordance with an embodiment. As illustrated, the coated abrasive 400 can include a substrate 401 and a make coat 403 overlying a surface of the substrate 401. The coated abrasive 400 can further include abrasive particulate material 406. The abrasive particulate material 406 can include a first type of particles including shaped abrasive particles 405 and a second type of abrasive particulate material 407 in the form of diluent abrasive particles. The diluent abrasive particles can have a random shape, and may not necessarily be shaped abrasive particles. The coated abrasive 400 may further include size coat 404 overlying and bonded to the abrasive particulate material 406 and the make coat 404.

According to one embodiment, the substrate 401 can include an organic material, inorganic material, and a combination thereof. In certain instances, the substrate 401 can include a woven material. However, the substrate 401 may be made of a non-woven material. Particularly suitable substrate materials can include organic materials, including polymers, and particularly, polyester, polyurethane, polypropylene, polyimides such as KAPTON from DuPont, or paper. Some suitable inorganic materials can include metals, metal alloys, and particularly, foils of copper, aluminum, steel, and a combination thereof.

The make coat 403 can be applied to the surface of the substrate 401 in a single process, or alternatively, the abrasive particulate material 406 can be combined with a make coat 403 material and applied as a mixture to the surface of the substrate 401. Suitable materials of the make coat 403 can include organic materials, particularly polymeric materials, including for example, polyesters, epoxy resins, polyurethanes, polyamides, polyacrylates, polymethacrylates, poly vinyl chlorides, polyethylene, polysiloxane, silicones, cellulose acetates, nitrocellulose, natural rubber, starch, shellac, and mixtures thereof. In one embodiment, the make coat 403 can include a polyester resin. The coated substrate can then be heated in order to cure the resin and the abrasive particulate material to the substrate. In general, the coated substrate 401 can be heated to a temperature of between about 100° C. to less than about 250° C. during this curing process.

The abrasive particulate material 406 can include shaped abrasive particles according to embodiments herein. In particular instances, the abrasive particulate material 406 may include different types of shaped abrasive particles. The different types of shaped abrasive particles can differ from each other in composition, two-dimensional shape, three-dimensional shape, size, and a combination thereof as described in the embodiments herein. As illustrated, the coated abrasive 400 can include a shaped abrasive particle 405 having a generally triangular two-dimensional shape.

The other type of abrasive particles 407 can be diluent particles different than the shaped abrasive particles 405. For example, the diluent particles can differ from the shaped abrasive particles 405 in composition, two-dimensional shape, three-dimensional shape, size, and a combination thereof. For example, the abrasive particles 407 can represent conventional, crushed abrasive grit having random shapes. The abrasive particles 407 may have a median particle size less than the median particle size of the shaped abrasive particles 405.

After sufficiently forming the make coat 403 and the abrasive particulate material 406, the size coat 404 can be formed to overlie and bond the abrasive particulate material 406 in place. The size coat 404 can include an organic material, may be made essentially of a polymeric material, and notably, can use polyesters, epoxy resins, polyurethanes, polyamides, polyacrylates, polymethacrylates, poly vinyl chlorides, polyethylene, polysiloxane, silicones, cellulose acetates, nitrocellulose, natural rubber, starch, shellac, and mixtures thereof.

Figure 5:
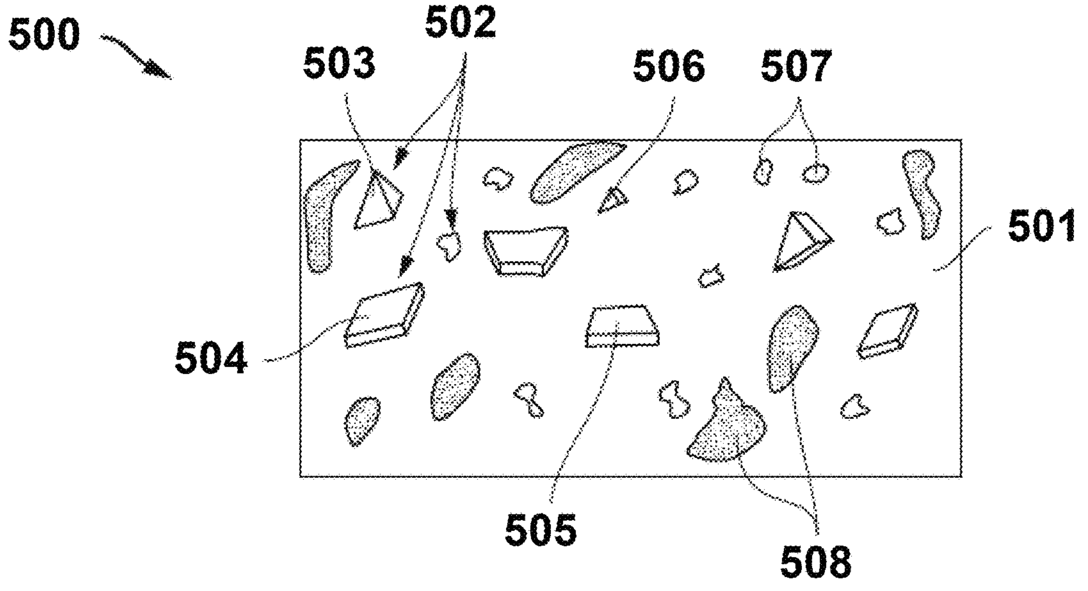
FIG. 5 includes a bonded abrasive including shaped abrasive particles according to an embodiment.

FIG. 5 includes an illustration of a bonded abrasive article incorporating the abrasive particulate material in accordance with an embodiment. As illustrated, the bonded abrasive 500 can include a bond material 501, abrasive particulate material 502 contained in the bond material, and porosity 508 within the bond material 501. In particular instances, the bond material 501 can include an organic material, inorganic material, and a combination thereof. Suitable organic materials can include polymers, such as epoxies, resins, thermosets, thermoplastics, polyimides, polyamides, and a combination thereof. Certain suitable inorganic materials can include metals, metal alloys, vitreous phase materials, crystalline phase materials, ceramics, and a combination thereof.

In some instances, the abrasive particulate material 502 of the bonded abrasive 500 can include shaped abrasive particles 503, 504, 505, and 506. In particular instances, the shaped abrasive particles 503, 504, 505, and 506 can be different types of particles, which can differ from each other in composition, two-dimensional shape, three-dimensional shape, size, and a combination thereof as described in the embodiments herein. Alternatively, the bonded abrasive article can include a single type of shaped abrasive particle.

The bonded abrasive 500 can include a type of abrasive particulate material 507 representing diluent abrasive particles, which can differ from the shaped abrasive particles 503, 504, 505, and 506 in composition, two-dimensional shape, three-dimensional shape, size, and a combination thereof.

The porosity 508 of the bonded abrasive 500 can be open porosity, closed porosity, and a combination thereof. The porosity 508 may be present in a majority amount (vol %) based on the total volume of the body of the bonded abrasive 500. Alternatively, the porosity 508 can be present in a minor amount (vol %) based on the total volume of the body of the bonded abrasive 500. The bond material 501 may be present in a majority amount (vol %) based on the total volume of the body of the bonded abrasive 500. Alternatively, the bond material 501 can be present in a minor amount (vol %) based on the total volume of the body of the bonded abrasive 500. Additionally, abrasive particulate material 502 can be present in a majority amount (vol %) based on the total volume of the body of the bonded abrasive 500. Alternatively, the abrasive particulate material 502 can be present in a minor amount (vol %) based on the total volume of the body of the bonded abrasive 500.

Figure 6:
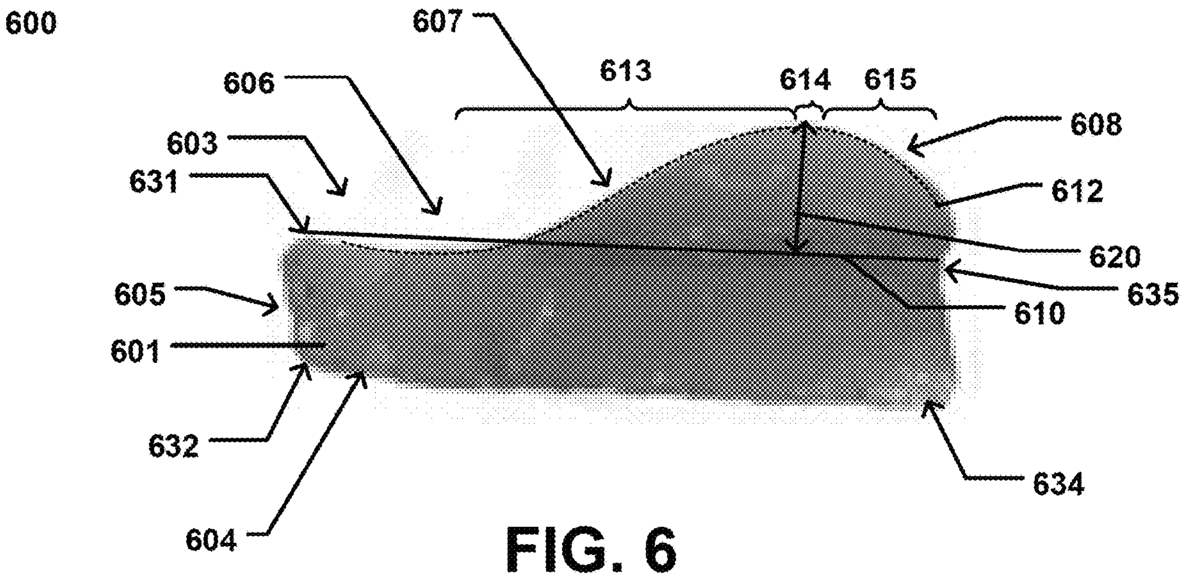
FIG. 6 includes a side view image of a shaped abrasive particle according to an embodiment.

According to one aspect, the system and method herein may facilitate the formation of shaped abrasive particles having certain features. For example, in one embodiment, a shaped abrasive particle can include a body having a tortuous contour, which may be facilitated by particular aspects of the forming process. In particular instances, the tortuous contour can include a first curved portion, a second curved portion, and a planar portion joining the first curved portion and the second curved portion. FIG. 6 includes a side view (inverted color) image of a shaped abrasive particle made according to an embodiment herein. The shaped abrasive particle 600 can include a body 601 having a first major surface 603, a second major surface 604, and a side surface 605 extending between and separating the first major surface 603 and the second major surface 604. In particular, and in accordance with an embodiment, the first major surface 603 can have a tortuous contour, which may include a first curved portion 606, a second curved portion 608, and a substantially planar or linear region 607 connecting and extending between the first curved portion 606 and the second curved portion 608. In one particular embodiment, the first curved portion 606 may define a substantially arcuate curvature, which may include a substantially convex curvature. The second curved portion 608 can be spaced apart from the first curved portion 606 and define a substantially arcuate curvature, and particularly, a substantially concave portion.

In certain embodiments, such as illustrated in FIG. 6 the first curved portion 606 can define a first radius of curvature and the second curved portion 608 can define a second radius of curvature according to a portion of the curve best fit to a circle. Such analysis may be completed using imaging software, such as ImageJ. In one embodiment, the first curved portion 606 and the second curved portion 608 can have different radiuses of curvatures compared to each other. In still another embodiment, the radius of curvatures associated with the first curved portion 606 and second curved portion 608 may be substantially similar. Moreover, in another particular embodiment, it has been observed that the tortuous contour of the first major surface 603 can include a first curved portion 606 having a radius of curvature that is greater than an average height of the body 601, wherein the height can be measured as the average distance between the first major surface 603 and second major surface 604. Additionally, in another embodiment, it has been observed that the tortuous contour of the first major surface 604 can include a second curved portion 608 having a radius of curvature that is greater than the average height of the body 601.

In accordance with one particular embodiment, the tortuous contour can include a particular waviness. The waviness can be defined as a portion of any surface having the tortuous contour including a first curved portion extending above a line and further comprising a second curved portion extending below the line. Referring again to FIG. 6, a line 610 is drawn between the corners of the first major surface 603 and the side surface 605 of the body 601. In some instances, the line 610 may be parallel to the opposing major surface if the opposite major surface defines a substantially planar surface, such as the second major surface 604 of the body 601 shown in FIG. 6. As illustrated, the first major surface can have a tortuous contour including a waviness, wherein the first curved portion 606 includes a region of the first major surface 603 that extends on one side (i.e., below in the orientation illustrated) and the second curved portion 608 includes a region of the first major surface 603 that extends on the opposite side (i.e., above in the orientation illustrated) of the line 610 relative to the region of the first major portion 606.

In a particular embodiment, the curved portions can define a peak height or valley height depending on the relationship of the curved portions 606 and 608 relative to the line 610. The peak height can be the greatest distance between a point within the curved portion and the line 610. For example, the second curved portion 608 can have a peak height 620 as the greatest distance between a point on the first major surface 602 within the second curved portion 608 and the line 610, in a direction perpendicular to the line and generally extending in the direction of the height of the particle as viewed from the side. According to one embodiment, the peak height 620 can be at least about 5% of an average height of the body 601. In other instances, it can be greater, such as at least about 10%, at least about 15%, at least about 20%, at least about 25%, at least about 30%, at least about 35%, at least about 40%, or even at least about 50%. In still another non-limiting embodiment, the peak height 620 can be less than about 150%, such as less than about 90% of the average height of the particle. It will be appreciated that the peak height can be within a range between any of the above minimum and maximum percentages.

Moreover, while not illustrated, the first curved portion 606 can define a valley height, as the maximum distance between the line 610 and a portion of the first major surface 603 within the first curved portion 606. The valley height can have the same features as the peak height 620 associated with the second curved portion 608.

In another embodiment, the tortuous contour can be defined by a portion of the body wherein a slope of a trace line extending along the tortuous contour changes slope from a region defining a positive slope of the trace line, to a slope of zero, to a negative slope. For example, referring to FIG. 6, a trace line 612 can be formed along the tortuous surface and define a first region 613 having a positive slope, a region 614 including a slope of zero, and a region wherein the slope of the trace line 612 changes to a negative value. It will be appreciated that a tortuous surface can include additional changes in slope, including for example, an additional transition to a region having a slope of zero, and a transition to a region having a positive or negative slope. Such characteristics may be defined generally as a sinusoidal-like curve, which is not to be interpreted as requiring the trace line 612 to comply with the exact mathematical formula of a sine wave function, but rather as a description of the approximate change in curvature of the trace line 612.

Notably, as illustrated in the embodiment of FIG. 6, the tortuous contour can extend along a first major surface 603 of the body 601. However, it will be appreciated that in other embodiments, the tortuous contour may extend along other surfaces of the body 601, including, but not limited to, the second major surface 604 and the side surface 605. Moreover, it will be appreciated that more than one surface of the body 601 of a shaped abrasive particle according to embodiments herein can exhibit a tortuous contour.

The tortuous contour can extend along at least a portion of any surface of the body 601. In particular instances, the tortuous contour can extend along a majority of at least one surface (e.g., the first major surface 603, second major surface 604, or side surface 605) of the body 601. In more particular instances, the tortuous contour can define at least about 60%, such as at least about 70%, at least about 80%, at least about 90%, or even essentially all of at least one surface of the body 601.

Moreover, other surfaces not exhibiting a tortuous surface may have other features, including other features of the embodiments herein (e.g., a fractured surface, an arrowhead shape, etc.) or even a substantially planar contour. For example, any one of the surfaces of the body 601 including but not limited to, the first major surface 603, second major surface 604, and side surface 605, not having a tortuous surface, may exhibit a substantially planar surface. Still, it will be appreciated that surfaces exhibiting a tortuous surface may have additional features, including other features of the embodiments herein, including for example, a fractured surface, an arrowhead shape, and the like.

In accordance with another aspect, the body 601 can have a first corner 631 comprising a first height, measured as the distance between the first major surface 603 and the second major surface 604 along the side surface 605, and more particularly, the distance between the corner 631 and the corner 631 in a direction of the height perpendicular to the line 610. The body 601 can have a second height at the second corner 635, measured as the distance between the first major surface 603 and the second major surface 604 along the side surface 605, and more particularly, the distance between the corner 635 and the corner 634 in a direction of the height perpendicular to the line 610. In particular, the first height can be significantly different than the second height. In certain embodiments, the first height can be significantly less than the second height.

Figure 7:
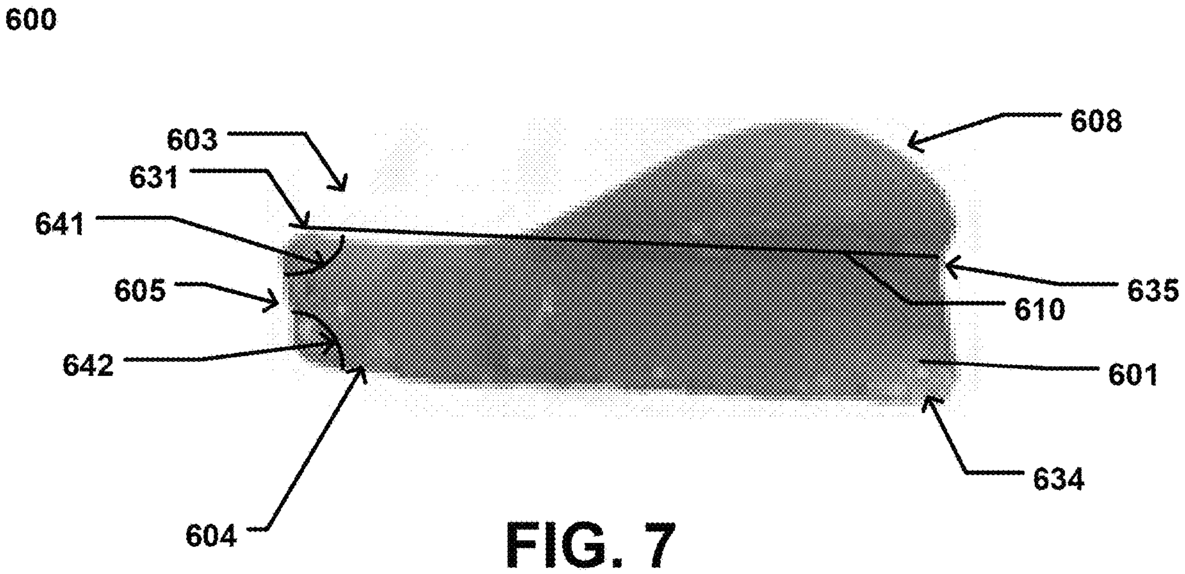
FIG. 7 includes a side view image of a shaped abrasive particle according to an embodiment.

In accordance with an embodiment, the body 601 of the shaped abrasive particle 600 can include a first upper angle 641 between the first major surface 603 and the side surface 605 as viewed from the side as illustrated in FIG. 7. The first upper angle 641 can be at least about 80 degrees, such as at least about 85 degrees. In other embodiments, the first upper angle can be not greater than about 110 degrees. In at least one embodiment, the side surface 605 can extend at a generally orthogonal angle relative to at least one of the first major surface 603 and the second major surface 604. More particularly, the side surface 605 can extend at a generally orthogonal angle relative to the first major surface 603 and the second major surface 604.

The body 601 of the shaped abrasive particle 600 can include a second lower angle 642 between the second major surface 603 and the side surface 605 as viewed from the side as illustrated in FIG. 7. The second lower angle 642 can be at least about 80 degrees, such as at least about 85 degrees.

In other embodiments, the second lower angle 642 can be not greater than about 110 degrees.

Figure 8:
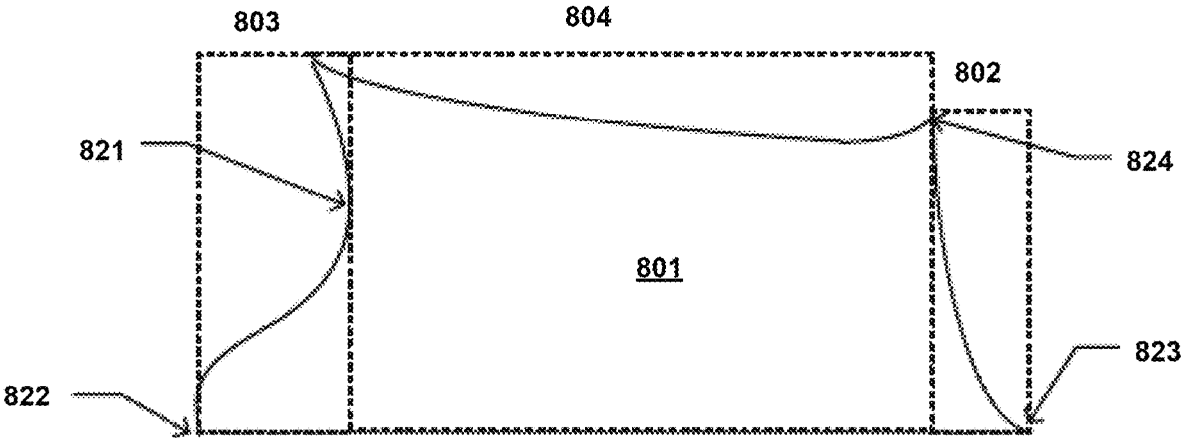
FIG. 8 includes an illustration of a side view of a shaped abrasive particle having flashing in accordance with an embodiment.

The shaped abrasive particles of the embodiments herein can have a percent flashing that may facilitate improved performance. Notably, the flashing can define an area of the particle as viewed along one side, such as illustrated in FIG. 8, wherein the flashing extends from a side surface of the body 801 within the boxes 802 and 803. The flashing can represent tapered regions proximate to the upper surface and bottom surface of the body 801. The flashing can be measured as the percentage of area of the body 801 along the side surface contained within a box extending between an innermost point of the side surface (e.g., 821) and an outermost point (e.g., 822) on the side surface of the body to define the box 803. The flashing within the box 802 can be measured as the percentage of area of the body along the side surface contained within a box extending between an innermost point of the side surface 824 and an outermost point at 823 on the side surface of the body 801. In one particular instance, the body 801 can have a particular content of flashing, which can be the percentage of area of the body contained within the boxes 802 and 803 compared to the total area of the body contained within boxes 802, 803, and 804. According to one embodiment, the percent flashing (f) of the body can be at not greater about 10%. In another embodiment, the percent flashing can be less, such as at not greater than about 9%, not greater than about 8%, not greater than about 7%, not greater than about 6%, not greater than about 5%, or even not greater than about 4%. Still, in one non-limiting embodiment, the percent flashing can be at least about 0.1%, at least about 0.5%, at least about 1%, or even at least about 2%. It will be appreciated that the percent flashing of the body 801 can be within a range between any of the above minimum and maximum percentages. Moreover, it will be appreciated that the above flashing percentages can be representative of an average flashing percentage or a median flashing percentage for a batch of shaped abrasive particles.

The percent flashing can be measured by mounting the shaped abrasive particle on its side and viewing the body 801 at the side to generate a black and white image, such as the orientations illustrate in FIGS. 6 and 7. A suitable program for such includes ImageJ software. The percentage flashing can be calculated by determining the area of the body 801 in the boxes 802 and 803 compared to the total area of the body as viewed at the side (total shaded area), including the area in the center 804 and within the boxes. Such a procedure can be completed for a suitable sampling of particles to generate average, median, and/or and standard deviation values.

Figure 9:
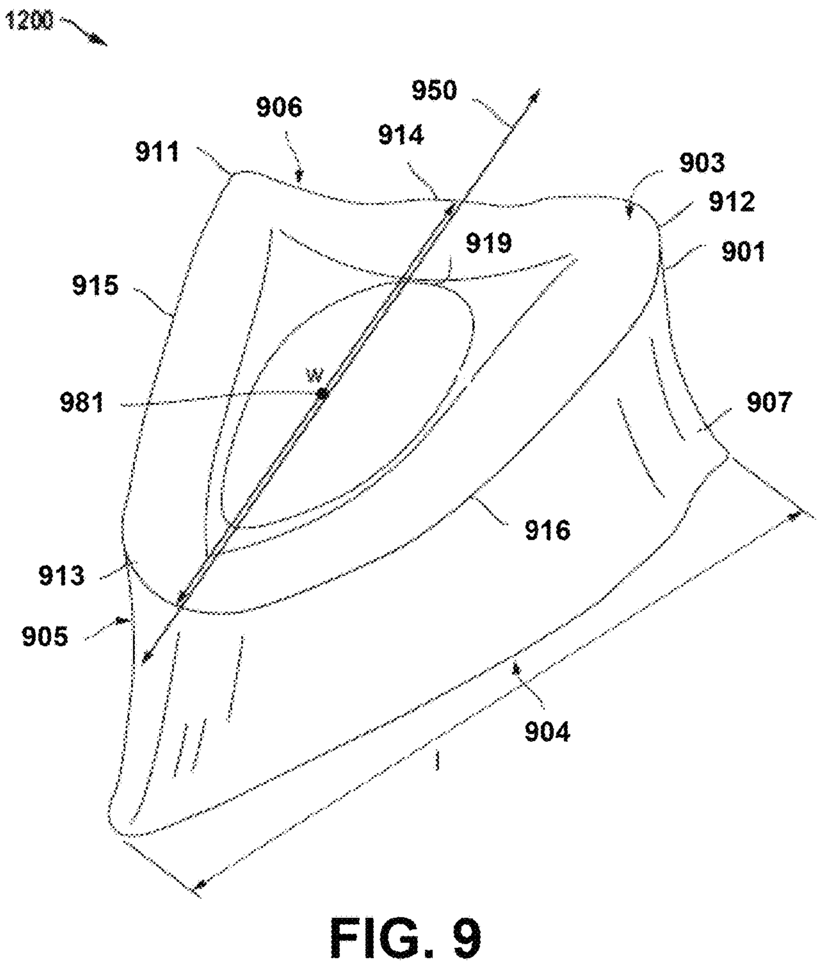
FIG. 9 includes a perspective view image of a shaped abrasive particle according to an embodiment.

FIG. 9 includes a perspective view illustration of an abrasive particle in accordance with an embodiment. The body 901 includes an upper surface 903 a bottom major surface 904 opposite the upper surface 903. The upper surface 903 and the bottom surface 904 can be separated from each other by side surfaces 905, 906, and 907. As illustrated, the body 901 of the shaped abrasive particle 900 can have a generally triangular shape as viewed in a plane of the upper surface 903. In particular, the body 901 can have a length (Lmiddle), which may be measured at the bottom surface 904 of the body 901 and extending from a corner 913 through a midpoint 981 of the body 901 to a midpoint at the opposite edge 914 of the body. Alternatively, the body can be defined by a second length or profile length (Lp), which can be the measure of the dimension of the body from a side view at the upper surface 903 from a first corner 913 to an adjacent corner 912. Notably, the dimension of Lmiddle can be a length defining a distance between a height at a corner (hc) and a height at a midpoint edge (hm) opposite the corner. The dimension Lp can be a profile length along a side of the particle.

The body 901 can further include a width (w) that is the longest dimension of the body and extending along a side. The shaped abrasive particle can further include a height (h), which may be a dimension of the shaped abrasive particle extending in a direction perpendicular to the length and width in a direction defined by a side surface of the body 901. Notably, body 901 can be defined by various heights depending upon the location on the body where the height is measured, such as at the corners versus the interior of the body 901. According to at least the embodiment of FIG. 9, the width can be greater than or equal to the length, the length can be greater than or equal to the height, and the width can be greater than or equal to the height.

Moreover, reference herein to any dimensional characteristic (e.g., height, length, width, etc.) can be reference to a dimension of a single particle of a batch, a median value, or an average value derived from analysis of a suitable sampling of particles from a batch. Unless stated explicitly, reference herein to a dimensional characteristic can be considered reference to a median value that is a based on a statistically significant value derived from a sample size of suitable number of particles of a batch of particles. For certain embodiments herein, the sample size can include at least 15 randomly selected particles from a batch of particles.

In accordance with an embodiment, the body 901 of the shaped abrasive particle can have a first corner height (hc) at a first region of the body defined by a corner 913. Notably, the corner 913 may represent the point of greatest height on the body 901. However, the height at the corner 913 does not necessarily represent the point of greatest height on the body 901. The corner 913 can be defined as a point or region on the body 901 defined by the joining of the upper surface 903, and two side surfaces 905 and 907. The body 901 may further include other corners, spaced apart from each other, including for example, corner 911 and corner 912. As further illustrated, the body 301 can include edges 914, 915, and 916 that can separated from each other by the corners 911, 912, and 913. The edge 914 can be defined by an intersection of the upper surface 303 with the side surface 906. The edge 915 can be defined by an intersection of the upper surface 903 and side surface 905 between corners 911 and 913. The edge 916 can be defined by an intersection of the upper surface 903 and side surface 907 between corners 912 and 913.

The shaped abrasive particle can have a body having a particular amount of dishing, wherein the dishing value (d) can be defined as a ratio between an average height of the body at the corners (Ahc) as compared to smallest dimension of height of the body at the interior (hi), which may be a position spaced away from the corners 911, 912, and 913 and within the interior of the body 901, such as proximate to the midpoint 981 within region 919. The average height of the body at the corners (Ahc) can be calculated by measuring the height of the body at all corners 911, 912, and 913 and averaging the values, and may be distinct from a single value of height at one corner (hc). For example, in the case of a shaped abrasive particle having a triangular shape, three height values can be taken at the three corners of the triangular shape. The average height of the body at the corners or at the interior can be measured using a STIL (Sciences et Techniques Industrielles de la Lumiere-France) Micro Measure 3D Surface Profilometer (white light (LED)

chromatic aberration technique). Alternatively, the dishing may be based upon a median height of the particles at the corner (Mhc) calculated from a suitable sampling of particles from a batch. Likewise, the interior height (hi) can be a median interior height (Mhi) derived from a suitable sampling of shaped abrasive particles from a batch. According to one embodiment, the dishing value (d) can be not greater than about 2, such as not greater than about 1.9, not greater than about 1.8, not greater than about 1.7, not greater than about 1.6, or even not greater than about 1.5, not greater than about 1.3, or even not greater than about 1.2. Still, in at least one non-limiting embodiment, the dishing value (d) can be at least about 0.9, such as at least about 1.0. It will be appreciated that the dishing ratio can be within a range between any of the minimum and maximum values noted above. Moreover, it will be appreciated that the above dishing values can be representative of a median dishing value (Md) for a batch of shaped abrasive particles.

Figure 10:
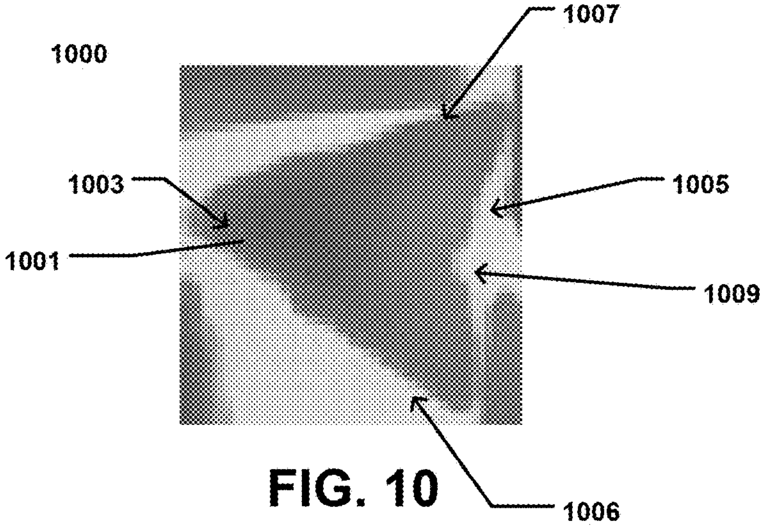
FIG. 10 includes a top view image of a shaped abrasive particle according to an embodiment.

In another embodiment, the shaped abrasive particle can include a body comprising an arrowhead shape. FIG. 10 includes an image of a shaped abrasive particle having an arrowhead shape according to an embodiment. As illustrated, the shaped abrasive particle 1000 can include a body 1001 including a first major surface 1003, a second major surface opposite the second major surface, and a first side surface 1005, a second side surface 1006, and a third side surface 1007. The body 1001 can have any of the other features of shaped abrasive particles described herein, and in particular, can utilize one or more substantially planar contours and/or tortuous contour surfaces.

In accordance with a particular embodiment, first side surface 1005 can extend into a volume of the body 1001, and the second side surface 1006 and the third side surface 1008 can be substantially planar. In particular instances, such as illustrated in FIG. 10, at least a portion of the first side surface 1005 can define an arcuate portion, and in particular may define a substantially concave portion. Accordingly, the angle between the second side surface 1006 and the third side surface 1007, as viewed top-down as shown in FIG. 10, can be different than the angle of the corner between the first side surface 1005 and the second side surface 1006. Additionally, or alternatively, the angle between the second side surface 1006 and the third side surface 1007, as viewed top-down as shown in FIG. 10, can be different than the angle of the corner between the first side surface 1005 and the third side surface 1007. More particularly, the angle between the first side surface 1005 and the second side surface 1006 can be less than the angle between the second side surface 1006 and the third side surface 1007. Likewise, in certain instances, the angle between the first side surface 1005 and the third side surface 1007 can be less than the angle between the second side surface 1006 and the third side surface 1007.

The body 1001 can further include a fractured region 1009 on at least a portion of the first side surface 1005. For example, the body 1001 can have a fractured region 1009 intersecting at least a portion of an edge defining the first major surface 1003 or second major surface. The fractured region 1009 can be characterized by having a surface roughness greater than a surface roughness of at least the first major surface 1003 or the second major surface of the body 1001. The fractured region 1009 can be characterized by irregularly shaped protrusions and grooves extending from the first side surface 1005. In certain instances, the fractured region 1009 can appear as and define a serrated edge. In certain instances, the fracture region 1009 may be preferentially located at or near the corners of the arms of the body. In still other instances, it has been noted that a fractured region 1009 may be formed at a center of the first side surface 1005 defining an arcuate surface giving the body 1001 an arrowhead shape. The fractured region 1009 can extend from the second major surface and extend vertically for a fraction of the entire height of the first side surface 1005 or even for the entire height of the first side surface 1005.

It will be appreciated that any of the characteristics of the embodiments herein can be attributed to a batch of shaped abrasive particles. A batch of shaped abrasive particles can include, but need not necessarily include, a group of shaped abrasive particles made through the same forming process. In yet another instance, a batch of shaped abrasive particles can be a group of shaped abrasive particles of an abrasive article, such as a fixed abrasive article, and more particularly, a coated abrasive article, which may be independent of a particular forming method, but having one or more defining features present in a particular population of the particles. For example, a batch of particles may include an amount of shaped abrasive particles suitable for forming a commercial grade abrasive product, such as at least about 20 lbs. of particles.

Moreover, any of the features of the embodiments herein (e.g., aspect ratio, planar portions, tortuous contour, arrowhead shape, fractured region, two-dimensional shape, etc.) can be a characteristic of a single particle, a median value from a sampling of particles of a batch, or an average value derived from analysis of a sampling of particles from a batch. Unless stated explicitly, reference herein to the characteristics can be considered reference to a median value that is a based on a statistically significant value derived from a random sampling of suitable number of particles of a batch. Notably, for certain embodiments herein, the sample size can include at least 10, such as at least about 15, and more typically, at least 40 randomly selected particles from a batch of particles.

Any of the features described in the embodiments herein can represent features that are present in at least a first portion of a batch of shaped abrasive particles. Moreover, according to an embodiment, that control of one or more process parameters can control the prevalence of one or more features of the shaped abrasive particles of the embodiments herein. Some exemplary process parameters include, but is not limited to, the characteristics of the mixture (e.g., viscosity, storage modulus, coil value), the rate of translation, the rate of extrusion, the batch efficiency, the batch productivity, the composition of the ejection material, the predetermined force, the ejection material opening width relative to the shaping assembly opening width, the gap distance, and a combination thereof.

The first portion may be a minority portion (e.g., less than 50% and any whole number integer between 1% and 49%) of the total number of particles in a batch, a majority portion (e.g., 50% or greater and any whole number integer between 50% and 99%) of the total number of particles of the batch, or even essentially all of the particles of a batch (e.g., between 99% and 100%). The provision of one or more features of any shaped abrasive particle of a batch may facilitate alternative or improved deployment of the particles in an abrasive article and may further facilitate improved performance or use of the abrasive article.

A batch of particulate material can include a first portion including a first type of shaped abrasive particle and a second portion including a second type of shaped abrasive particle. The content of the first portion and second portion within the batch may be controlled at least in part based upon certain processing parameters. Provision of a batch having a first portion and a second portion may facilitate alternative or improved deployment of the particles in an abrasive article and may further facilitate improved performance or use of the abrasive article.

The first portion may include a plurality of shaped abrasive particles, wherein each of the particles of the first portion can have substantially the same features, including for example, but not limited to, the same two-dimensional shape of a major surface. Other features include any of the features of the embodiments herein. The batch may include various contents of the first portion. For example, the first portion may be present in a minority amount or majority amount. In particular instances, the first portion may be present in an amount of at least about 1%, such as at least about 5%, at least about 10%, at least about 20%, at least about 30%, at least about 40%, at least about 50%, at least about 60%, or even at least about 70% for the total content of portions within the batch. Still, in another embodiment, the batch may include not greater than about 99%, such as not greater than about 90%, not greater than about 80%, not greater than about 70%, not greater than about 60%, not greater than about 50%, not greater than about 40%, not greater than about 30%, not greater than about 20%, not greater than about 10%, not greater than about 8%, not greater than about 6%, or even not greater than about 4% of the total portions within the batch. The batch can include a content of the first portion within a range between any of the minimum and maximum percentages noted above.

The second portion of the batch can include a plurality of shaped abrasive particles, wherein each of the shaped abrasive particles of the second portion can have substantially the same feature, including for example, but not limited to, the same two-dimensional shape of a major surface. The second portion can have one or more features of the embodiments herein, which can be distinct compared to the plurality of shaped abrasive particles of the first portion. In certain instances, the batch may include a lesser content of the second portion relative to the first portion, and more particularly, may include a minority content of the second portion relative to the total content of particles in the batch. For example, the batch may contain a particular content of the second portion, including for example, not greater than about 40%, such as not greater than about 30%, not greater than about 20%, not greater than about 10%, not greater than about 8%, not greater than about 6%, or even not greater than about 4%. Still, in at least on non-limiting embodiment, the batch may contain at least about 0.5%, such as at least about 1%, at least about 2%, at least about 3%, at least about 4%, at least about 10%, at least about 15%, or even at least about 20% of the second portion for the total content of portions within the batch. It will be appreciated that the batch can contain a content of the second portion within a range between any of the minimum and maximum percentages noted above.

Still, in an alternative embodiment, the batch may include a greater content of the second portion relative to the first portion, and more particularly, can include a majority content of the second portion for the total content of particles in the batch. For example, in at least one embodiment, the batch may contain at least about 55%, such as at least about 60% of the second portion for the total portions of the batch.

It will be appreciated that the batch can include additional portions, including for example a third portion, comprising a plurality of shaped abrasive particles having a third feature that can be distinct from the features of the particles of the first and second portions. The batch may include various contents of the third portion relative to the second portion and first portion. The third portion may be present in a minority amount or majority amount. In particular instances, the third portion may be present in an amount of not greater than about 40%, such as not greater than about 30%, not greater than about 20%, not greater than about 10%, not greater than about 8%, not greater than about 6%, or even not greater than about 4% of the total portions within the batch. Still, in other embodiments the batch may include a minimum content of the third portion, such as at least about 1%, such as at least about 5%, at least about 10%, at least about 20%, at least about 30%, at least about 40%, or even at least about 50%. The batch can include a content of the third portion within a range between any of the minimum and maximum percentages noted above. Moreover, the batch may include a content of diluent, randomly shaped abrasive particles, which may be present in an amount the same as any of the portions of the embodiments herein.

For example, in accordance with one particular aspect, a batch of shaped abrasive particles can include a first portion, which can include a shaped abrasive particle having a tortuous contour. The first portion can include any one or combination of features described in accordance with shaped abrasive particles having a tortuous contour. The first portion can be a majority of a total number of shaped abrasive particles of the batch. Alternatively, the first portion can be a minority of a total number of shaped abrasive particles of the batch. In yet one particular aspect, as noted herein, the first portion can be at least 1% of a total number of shaped abrasive particles of the batch. In yet another particular embodiment, as noted herein, the first portion can be not greater than about 99% of a total number of shaped abrasive particles of the batch.

Furthermore, in one particular aspect, the batch can also include a second portion of shaped abrasive particles, wherein the second portion of shaped abrasive particles have a discrete shape feature different than the tortuous contour of the shaped abrasive particles of the first portion. More particularly, exemplary discrete shape features can include, but are not limited to, dish-shaped particles, substantially planar particles, concavo-convex particles, shaped abrasive shards, molded shaped abrasive particles, screen-printed shaped abrasive particles, cast-and-cut shaped abrasive particles, multilayered abrasive particles, arrowhead-shaped particles, shaped abrasive particles having a complex shape, diluent abrasive particles, and a combination thereof.

It will be appreciated that the batch of shaped abrasive particles are part of a fixed abrasive article, which can include, but is not limited to, bonded abrasive articles (sec, for example, FIG. 5), coated abrasive articles (see, for example FIG. 4), and a combination thereof. In one particular embodiment, the fixed abrasive article can include a coated abrasive article, wherein the first portion of the batch includes a plurality of shaped abrasive particles, and each of the shaped abrasive particles of the plurality of shaped abrasive particles are arranged in a controlled orientation relative to a backing. Some exemplary types of controlled orientation can include at least one of a predetermined rotational orientation, a predetermined lateral orientation, and a predetermined longitudinal orientation. In such instances, the shaped abrasive particles may be oriented with respect to each other or with respect to a particular predetermined abrasive direction (i.e., direction for conducting material removal relative to a workpiece). Moreover, in certain instances, the shaped abrasive particle can be coupled to the backing in a side orientation relative to the backing, such that a side surface is closest to the surface of the backing. In an alternative embodiment, at least a significant portion of the shaped abrasive particles of the first portion can be coupled to the backing in a flat orientation relative to the backing, such that a major surface of the body is closest to the surface of the backing.

According to another aspect, the first portion of the batch can have a predetermined classification characteristic selected from the group consisting of average particle shape, average particle size, particle color, hardness, friability, toughness, density, specific surface area, and a combination thereof. Likewise, any of the other portions of the batch may be classified according to the above noted classification characteristics.

EXAMPLE 1

A mixture in the form of a gel is obtained having approximately 52 wt % solids loading of bochmite commercially available as Catapal B from Sasol Corp. combined with 48 wt % water containing a minority content of nitric acid and organic additives. The gel has a viscosity of approximately 70,000 Pa·s and a storage modulus of approximately 450,000 Pa, and a coil value of approximately 3000 N.

The gel is extruded from a die using a pressure of approximately 90 psi (552 kPa) into a screen comprising a metal material and having openings are in the shape of an equilateral triangle, and wherein the sides of the triangle have a length of approximately 3.4 mm and the openings have a depth of approximately 0.6 mm. During extrusion in the application zone, the screen is abutting a backing plate.

The gel is extruded into the openings and the screen with the gel in the openings is translated to an ejection zone at a rate of 1 m/min. Prior to entering the ejection zone, the gel passes through a heating zone including infrared lamps and having an average temperature of between approximately 50-90° C. The gel and the shaping assembly pass through the heating zone in approximately 30 seconds and essentially no volatiles are removed from the gel. Note that the heating zone is optional and may not be utilized in all instances.

The ejection zone includes an air knife, operated at a pressure of 90 psi and exerting approximately 20 N of force and a resulting pressure of approximately 0.3 N/mm$^2$ on the gel in the mold. The ejection material is air. The air knife has an ejection material opening that is approximately 2% of the shaping assembly opening width. As the gel contained within the openings of the screen passes the air knife, the gel is ejected and precursor shaped abrasive particles are formed.

The precursor shaped abrasive particles are then dried for approximately 20 hours in air at approximately 95° C. under standard atmospheric conditions of pressure and composition. The precursor shaped abrasive particles were calcined in a box furnace at approximately 600° C. for an 1 hour, and thereafter, the precursors shaped abrasive particles were sintered in a tube furnace up to 1320° C. for 3 to 20 minutes.

Figure 11A:
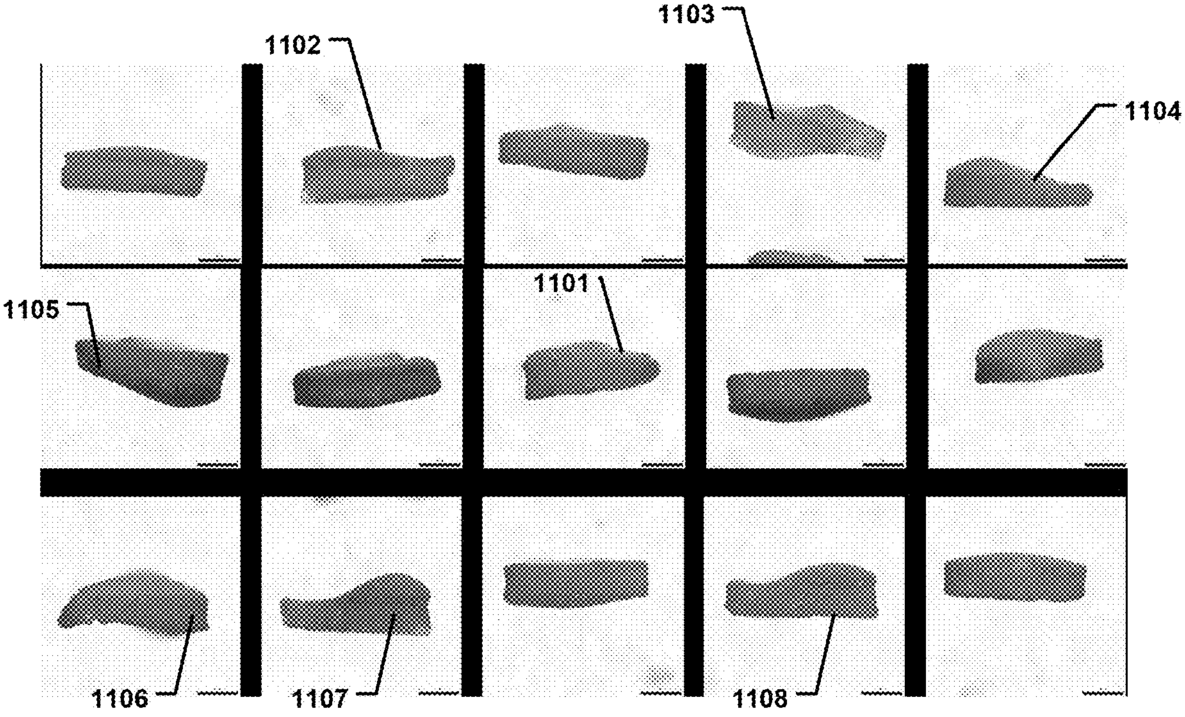
FIG. 11A includes side view images of shaped abrasive particles formed according to an embodiment.

FIG. 11A includes images (inverted color) of 15 particles, each viewed from the side. The images were taken with a light microscope. The 15 particles were taken from a sample of the batch made according to Example 1. As illustrated, at least a portion of the batch of shaped abrasive particle, and more particularly, 8 discrete shaped abrasive particles 1101, 1102, 1103, 1104, 1105, 1106, 1107, and 1108 of the 15 sampled particles, demonstrated a tortuous contour of at least one surface (e.g., the first major surface or second major surface).

Figure 11B:
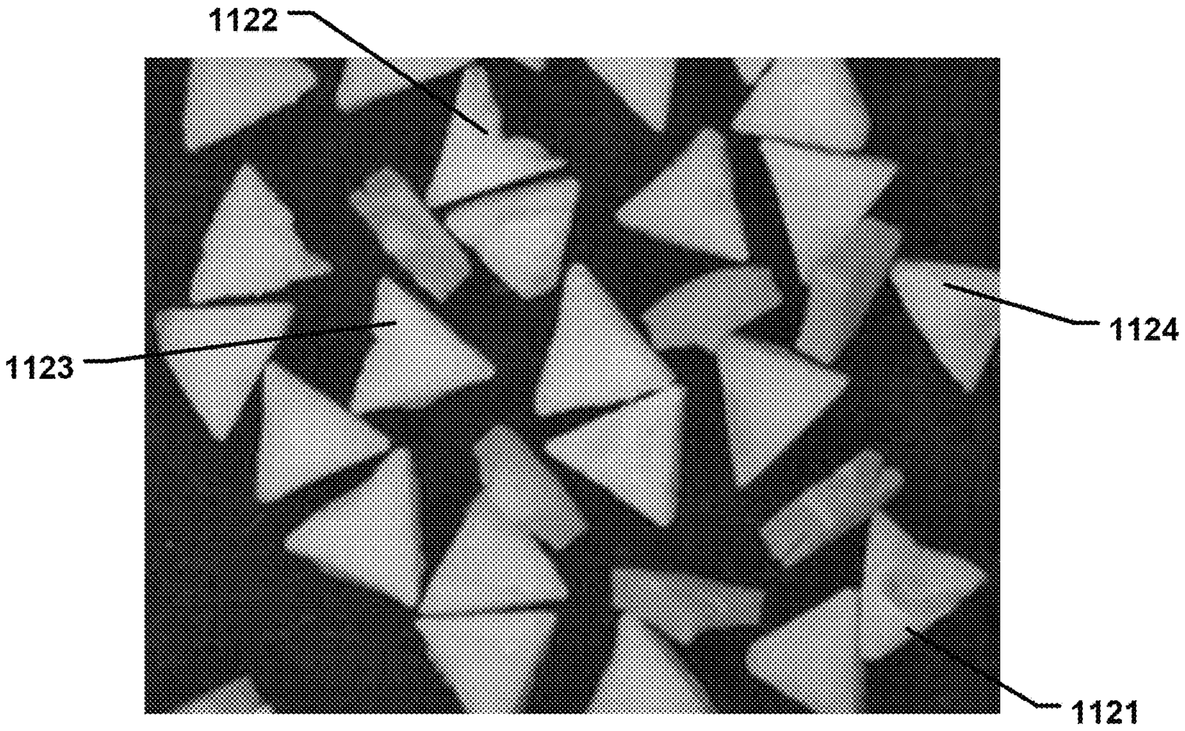
FIG. 11B includes a top view image of a plurality of shaped abrasive particles formed according to an embodiment.

FIG. 11B includes a top view image of a sample of grains from the batch of Example 1. Notably, a portion of the shaped abrasive particles of the batch have an arrowhead shape, including for example, the shaped abrasive particles 1121, 1122, 1123, and 1124.

The batch of shaped abrasive particles were then incorporated into a coated abrasive article as Sample 1 and tested according to the conditions provided below in Table 1. Notably, 2 sample coated abrasives were tested in each case to derive the results. Sample 1 represents a coated abrasive including the shaped abrasive particles of Example 1, and having a median width of approximately 1.5 mm, a median height of approximately 300 microns, a median flashing percentage of less than 10%, a dishing value of approximately 1.2, wherein approximately 80% of the abrasive particles were positioned in a predetermined, side orientation on the backing such that the side surface was in contact with the backing. Sample 1 had a normalized weight of shaped abrasive particles of 40 lbs/ream.

A second sample, (CS1) is a Cubitron II belt commercially available from 3M as 3M984F. Approximately 70% of the shaped abrasive particles, which have a generally planar shape, were positioned in a predetermined side orientation on the backing. The shaped abrasive particles appear to be molded particles, such as those disclosed in U.S. Pat. No. 5,366,523 to Rowenhorst.

TABLE 1

| | |
|---|---|
| Test platform: | Okuma Screening Test |
| Test conditions: | Dry, Rise and Fall |
| | Constant MRR' = 4 inch3/min inch |
| | Belt speed = Vs = 7500 sfpm (38 m/s) |
| | Work material: 304 ss, |
| | Hardness: 104 HRB |
| | Size: 0.5" × 0.5" × 6 inches |
| | Contact width = 0.5" inch |
| Measurements: | Power, Grinding Forces, MRR' and SGE |

Figure 12:
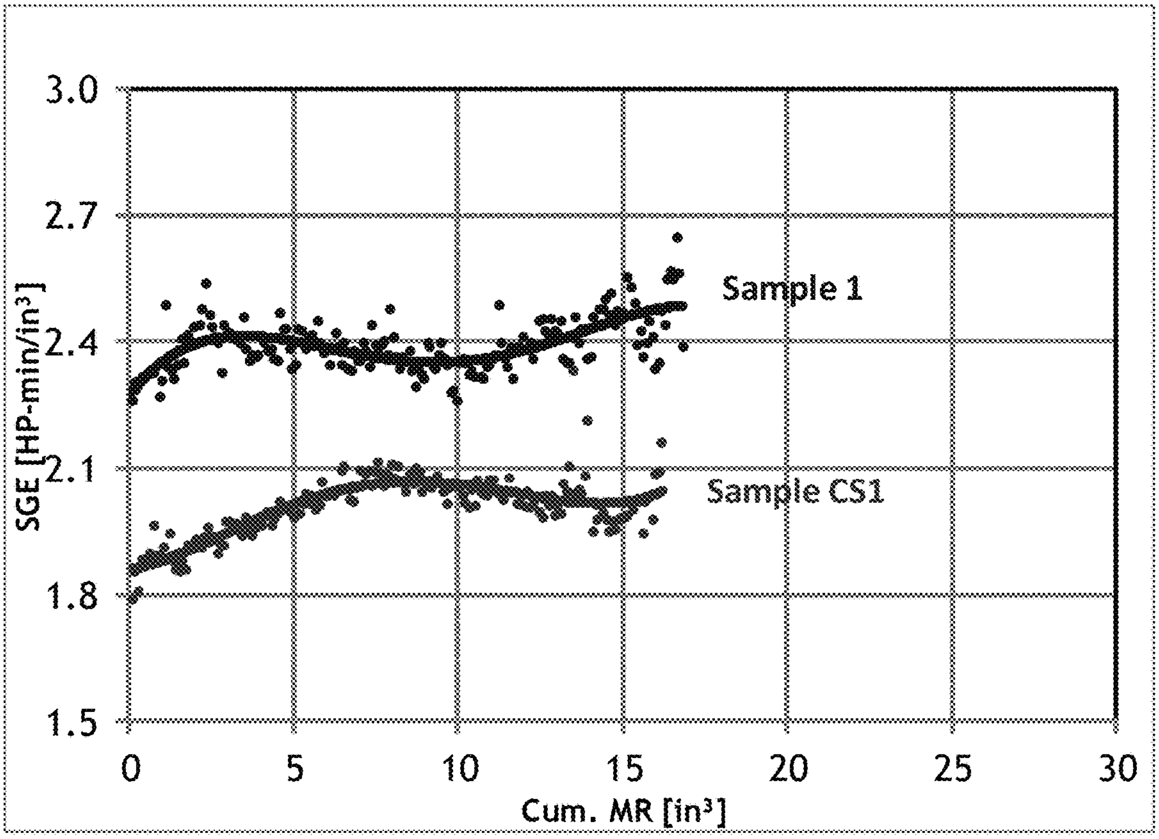
FIG. 12 includes a plot of specific grinding energy versus cumulative material removed for a conventional sample and a sample representative of an embodiment.

FIG. 12 includes a plot of specific grinding energy versus cumulative material removed (at a material removal rate of 4.0 inch3/min/inch) for Sample 1 and Sample CS1. As shown, while Sample 1 had a slightly higher specific grinding energy relative to Sample CS1, the specific grinding energy was relatively steady through 75% of the life of the belt. By contrast, Sample CS1 demonstrates a steadily rising specific grinding energy throughout the majority of the life the abrasive article. Moreover, and also remarkable, Sample 1 has essentially the same life (i.e., Cum MR) as compared to Sample CS1.

Figure 13:
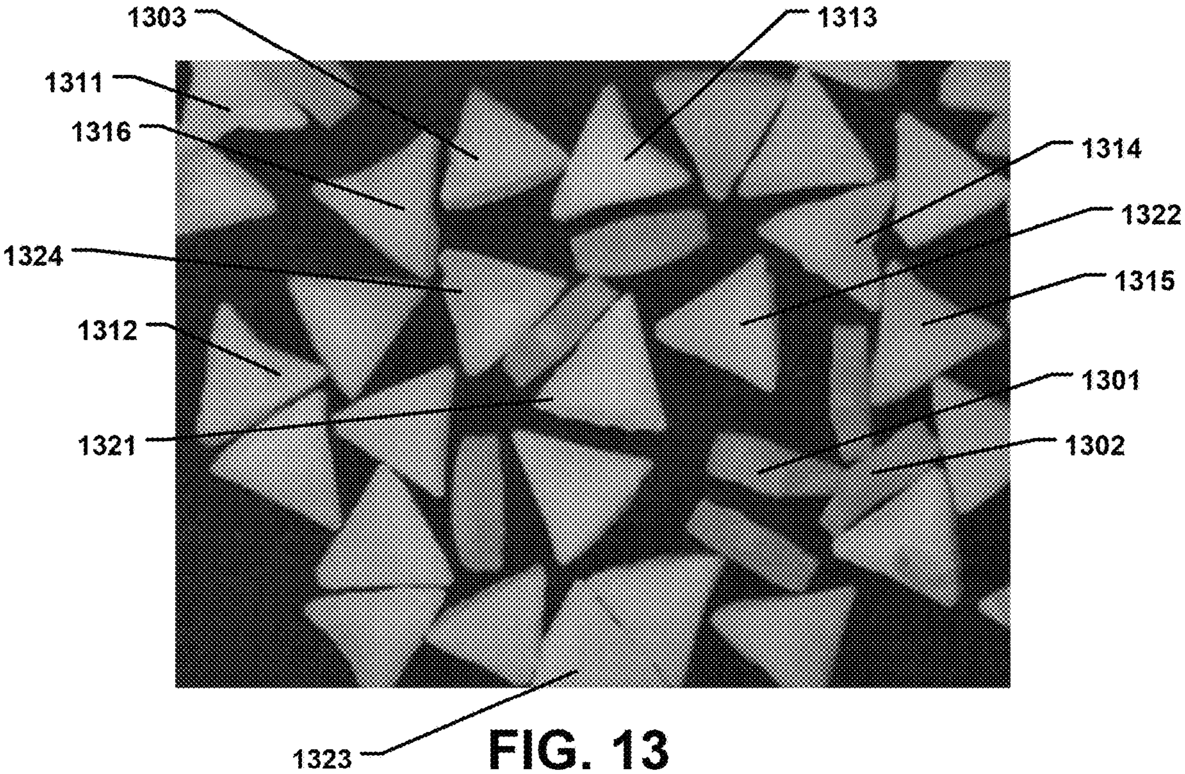
FIG. 13 includes a top view image of a plurality of shaped abrasive particles formed according to an embodiment.

FIG. 13 includes an image of a sample of shaped abrasive particles formed according to Example 1. Notably, at least a portion of the shaped abrasive particles of Sample 1 demonstrate a tortuous contour, including for example, shaped abrasive particles 1301, 1302, and 1303.

Moreover, as further illustrated in FIG. 13, a portion of the shaped abrasive particles of Sample 2 have an arrowhead shape, including for example, the shaped abrasive particles 1311, 1312, 1313, 1314, 1315, and 1316. Additionally, as illustrated in FIG. 13, a portion of the shaped abrasive particles of Sample 2 have side surfaces having a fractured region, including for example, the shaped abrasive particles 1303, 1314, 1316, 1321, 1322, 1323, and 1324.

The present application represents a departure from the state of the art. While the industry has recognized that shaped abrasive particles may be formed through processes such as molding and screen printing, the processes of the embodiments herein are distinct from such processes. Notably, the embodiments herein utilize particular systems and methods, having a combination of features, including but not limited to the type and rheological characteristics of the mixture, aspects of the application zone, length of the belt, relative size of openings in the ejection assembly and the openings in the first portion of the shaping assembly, predetermined force of ejection material, batch efficiency, batch productivity, and the like. Moreover, the resulting precursor shaped abrasive particles and sintered shaped abrasive particles have features unique to the forming process, including for example, tortuous contours, fractured regions, arrowhead shapes, dishing, flashing percentage, and others described herein. Notably, it is remarkable and unexpected that shaped abrasive particles can be formed with such precision and speed, which results in little to no change in the quality of an abrasive product incorporating the mass-produced particles as compared to other conventional abrasive products incorporating molded shaped abrasive particles. Furthermore, it has been discovered that in addition to the production capabilities of the new process, the system and process may be controlled in a manner to allow for control of certain features of shaped abrasive particles and formation of batches of shaped abrasive particles having certain features or combinations of features.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

The Abstract of the Disclosure is provided to comply with Patent Law and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all features of any of the disclosed embodiments. Thus, the following claims are incorporated into the Detailed Description of the Drawings, with each claim standing on its own as defining separately claimed subject matter.

What is claimed is:

1. A method comprising:

extruding a mixture into an opening in a shaping assembly within an application zone; and removing the mixture from the opening by applying an external force to the mixture to form a precursor shaped abrasive particle wherein the external force comprises a pressure of at least about 0.1 N.

2. The method of claim 1, wherein the mixture comprises a gel comprising a ceramic material and a liquid.

3. The method of claim 2, wherein the gel is a shape-stable material.

4. The method of claim 2, wherein the gel comprises a ceramic powder material as an integrated network of discrete particles.

5. The method of claim 1, wherein the mixture comprises an amount of a ceramic material of at least about 25 wt % for the total weight of the mixture and not greater than about 80 wt % for the total weight of the mixture.

6. The method of claim 1, wherein the mixture comprises not greater than about 30 wt % organic materials for the total weight of the mixture.

7. The method of claim 1, wherein the mixture comprises a storage modulus of at least about $1\times10^4$ Pa.

8. The method of claim 1, wherein the mixture comprises a change in weight of less than about 5% for a total weight of the mixture for a duration that the mixture is in the opening of the shaping assembly.

9. The method of claim 1, wherein the mixture comprises a change in volume of less than about 5% for a total volume of the mixture for a duration that the mixture is in the opening of the shaping assembly.

10. The method of claim 1, wherein an average residence time of the mixture in the opening of the shaping assembly is less than about 18 minutes.

11. The method of claim 2, wherein the ceramic material comprises an oxide, a nitride, a carbide, a boride, an oxycarbide, an oxynitride, or a combination thereof.

12. The method of claim 2, wherein the ceramic material comprises alumina.

13. The method of claim 1, wherein the mixture comprises a yield stress of at least about $1.5\times10^3$ Pa and not greater than about $50\times10^3$ Pa.

14. The method of claim 1, wherein the external force comprises a pressure of at least about 10 kPa and not greater than 10,000 kPa.

15. The method of claim 1, wherein the method further comprises cleaning the shaping assembly.

* * * * *